United States Patent
Shen et al.

(10) Patent No.: US 11,195,534 B1
(45) Date of Patent: Dec. 7, 2021

(54) PERMISSIONING FOR NATURAL LANGUAGE PROCESSING SYSTEMS

(71) Applicant: Amazon Technologies, Inc., Seattle, WA (US)

(72) Inventors: Zhengyan Shen, San Jose, CA (US); Saicharan Shriram Mujumdar, Sunnyvale, CA (US); Umesh Halappa, Alameda, CA (US)

(73) Assignee: Amazon Technologies, Inc., Seattle, WA (US)

( * ) Notice: Subject to any disclaimer, the term of this patent is extended or adjusted under 35 U.S.C. 154(b) by 74 days.

(21) Appl. No.: 16/834,214

(22) Filed: Mar. 30, 2020

(51) Int. Cl.
*G10L 17/22* (2013.01)
*G10L 13/02* (2013.01)
*G10L 17/00* (2013.01)

(52) U.S. Cl.
CPC ............ *G10L 17/22* (2013.01); *G10L 13/02* (2013.01); *G10L 17/00* (2013.01)

(58) Field of Classification Search
CPC .......... G10L 17/22; G10L 17/00; G10L 13/02
See application file for complete search history.

(56) References Cited

U.S. PATENT DOCUMENTS

| | | | |
|---|---|---|---|
| 6,415,257 B1* | 7/2002 | Junqua | G10L 17/00 704/275 |
| 6,901,366 B1* | 5/2005 | Kuhn | G06F 16/3334 704/275 |
| 2011/0112921 A1* | 5/2011 | Kennewick | G06Q 30/0601 705/26.1 |
| 2018/0189267 A1* | 7/2018 | Takiel | G06F 40/211 |

* cited by examiner

*Primary Examiner* — Huyen X Vo
(74) *Attorney, Agent, or Firm* — Pierce Atwood LLP

(57) ABSTRACT

Techniques for improving privacy protection by requesting consent to review and analyze a natural language interaction. A natural language processing (NLP) system may process a user query, provide a system response, and then request feedback indicating whether the system response was responsive to the user query. To improve an accuracy of the NLP system, the NLP system may request consent to review interaction data and generate training data in order to train a model. If consent is granted, the NLP system may store confirmation of the consent and share the interaction data for training. The NLP system may process the user query using a first skill but request the feedback using a separate feedback skill. Based on the feedback, the feedback skill may pass the interaction back to the first skill differently and/or cause the first skill to perform one or more different actions.

20 Claims, 22 Drawing Sheets

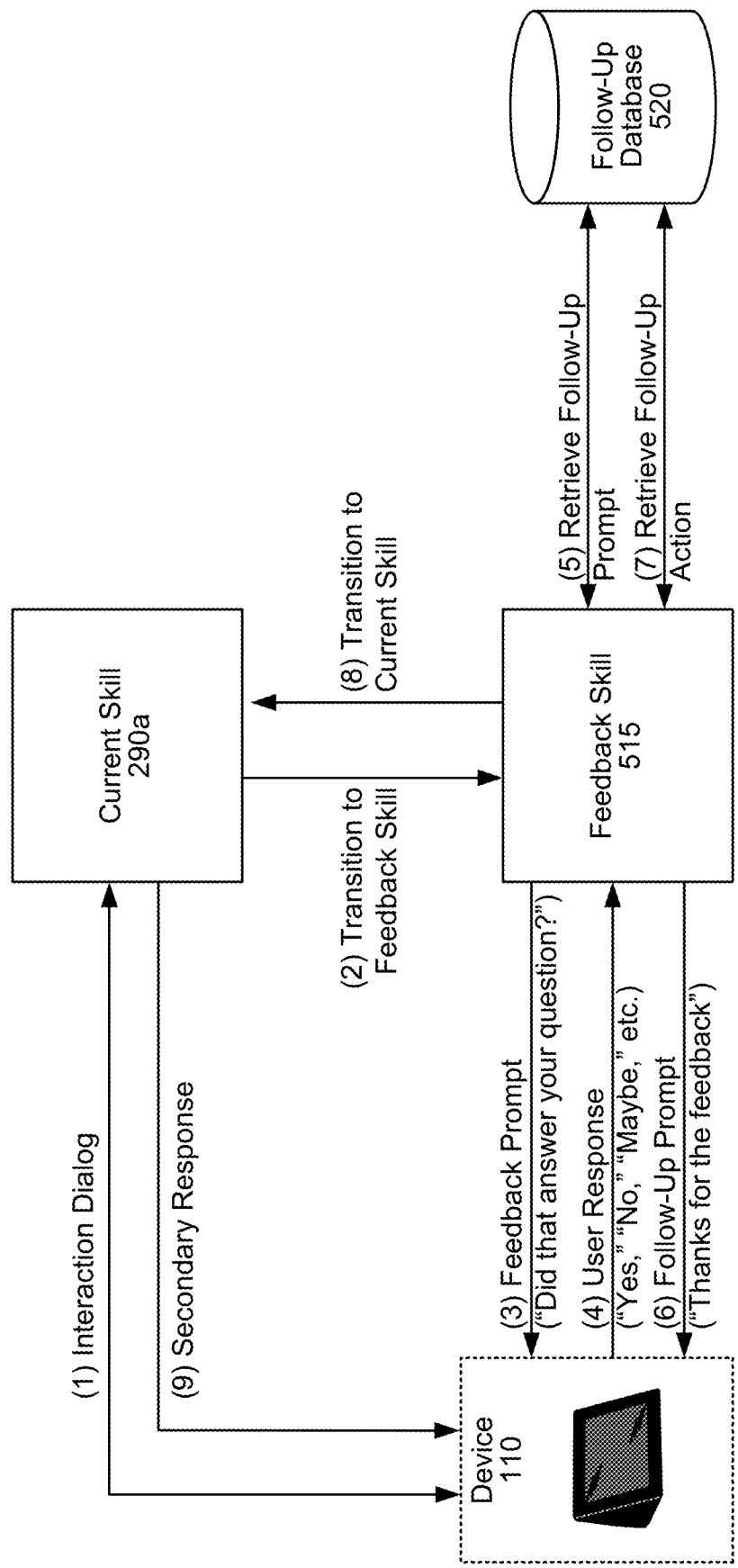

FIG. 8

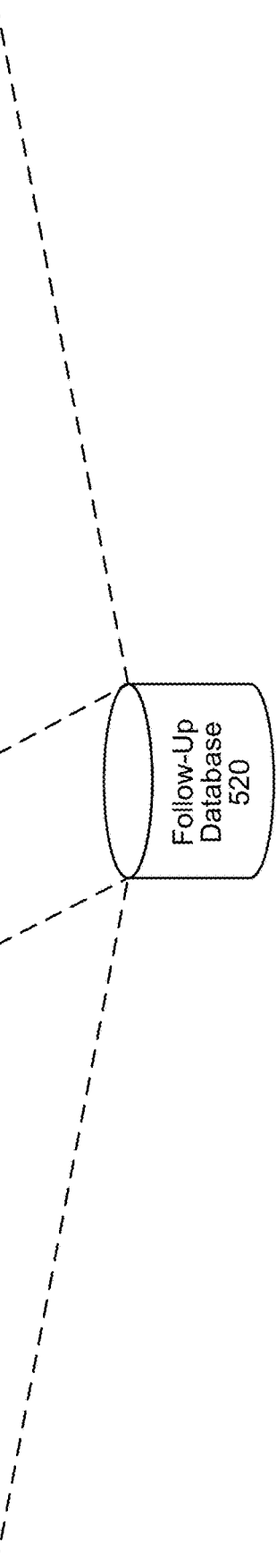

Follow-Up Action Table 820

| Source Identification <String: Source> | Feedback [Yes] <String> | Feedback [No] <String> | Feedback [Maybe] <String> |
|---|---|---|---|
| Source1 | <Action1> | <Action1> | <Action1> |
| Source2 | <Action2> | <Action3> | <Action3> |
| ... | ... | ... | ... |
| <SourceID> | <Action> | <Action> | <Action> |

Follow-Up Prompt Table 810

| Source Identification <String: Source> | Custom Feedback Prompt <String> |
|---|---|
| Source1 | <Prompt1> |
| Source2 | <Prompt2> |
| ... | ... |
| <SourceID> | <Prompt> |

Follow-Up Database 520

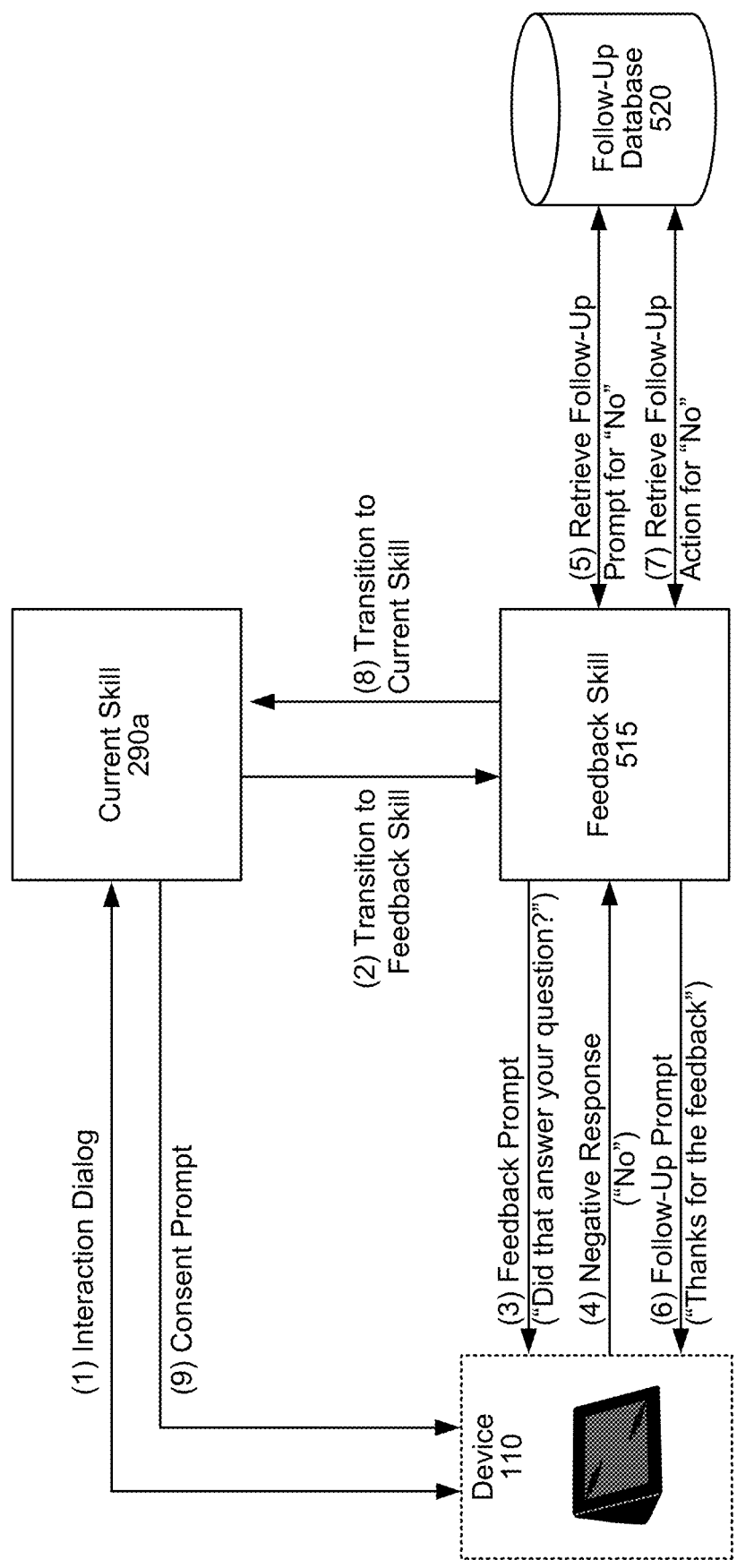

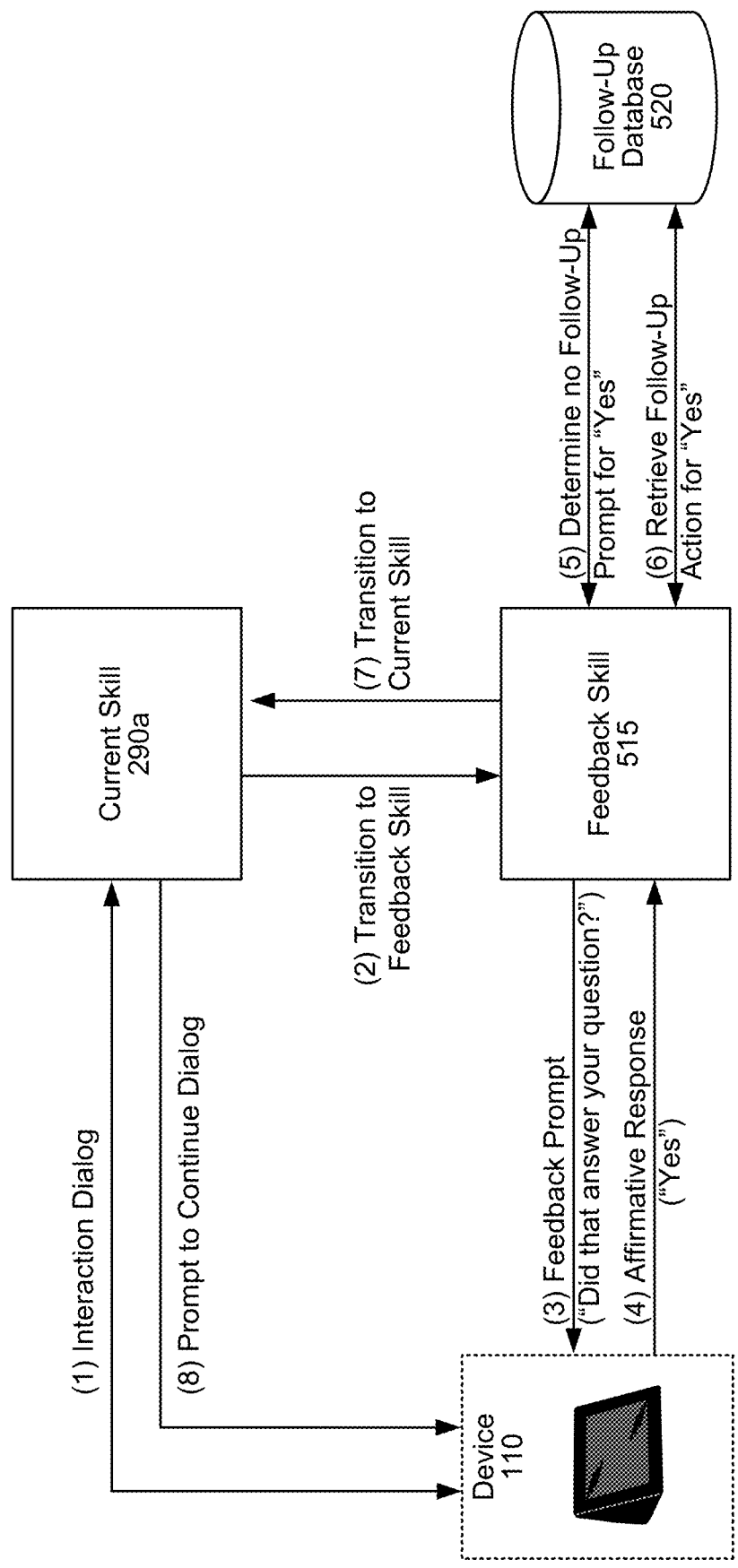

FIG. 10

| Custom Follow-Up Prompt | Feedback [Yes] | Feedback [No] | Feedback [Maybe] | Feedback Response Type | Expected Behavior |
|---|---|---|---|---|---|
| Prompt Present | Action Present | N/A | N/A | Yes | Render Prompt, Perform Feedback[Yes] |
| Prompt Present | N/A | Action Present | N/A | Yes | Render Prompt |
| Prompt Present | N/A | N/A | Action Present | Yes | Render Prompt |
| N/A | Action Present | N/A | N/A | Yes | Perform Feedback[Yes] |
| N/A | N/A | Action Present | N/A | Yes | Do nothing |
| N/A | N/A | N/A | Action Present | Yes | Do nothing |
| Prompt Present | Action Present | N/A | N/A | No | Render Prompt |
| Prompt Present | N/A | Action Present | N/A | No | Render Prompt, Perform Feedback[No] |
| Prompt Present | N/A | N/A | Action Present | No | Render Prompt |
| N/A | Action Present | N/A | N/A | No | Do nothing |
| N/A | N/A | Action Present | N/A | No | Perform Feedback[No] |
| N/A | N/A | N/A | Action Present | No | Do nothing |
| Prompt Present | Action Present | N/A | N/A | Maybe | Render Prompt |
| Prompt Present | N/A | Action Present | N/A | Maybe | Render Prompt |
| Prompt Present | N/A | N/A | Action Present | Maybe | Render Prompt, Perform Feedback[Maybe] |
| N/A | Action Present | N/A | N/A | Maybe | Do nothing |
| N/A | N/A | Action Present | N/A | Maybe | Do nothing |
| N/A | N/A | N/A | Action Present | Maybe | Perform Feedback[Maybe] |

Expected Behavior Table 1010

Message Payload passed to
Feedback Skill to initiate
Feedback

Message Payload passed from
Feedback Skill to Current Skill

```
Message Payload
1210
```
```
{
"utteranceId"     : "<string>",
"customerId"      : "<string>",
"source"          : "<string>",
"answerText"      : "<string>",
"follow-up-action" : "<string: address associated with skill>"
}
```

Message Payload passed to
Feedback Skill to initiate
Feedback

FIG. 13

| Utterance Identification <String; Primary Key> | Customer Identification <String> | Response Timestamp <String> | Response Type <String> | Follow-Up Identification(s) <List of String(s)> |
|---|---|---|---|---|
| Utterance ID3 | ABCDEFGHIJKLM123 | 2020-02-01T08:06:30 | Yes | Utterance ID1<br>Utterance ID2 |
| Utterance ID10 | ABCDEFGHIJKLM123 | 2020-02-01T08:23:00 | No | |
| Utterance ID23 | ABCDEFGHIJKLM123 | 2020-02-02T11:23:00 | Yes | Utterance ID8<br>Utterance ID9 |
| | ABCDEFGHIJKLM123 | 2020-02-03T18:52:30 | Yes | Utterance ID21<br>Utterance ID22 |
| ... | ... | ... | ... | ... |
| <UtteranceID> | <CustomerID> | <Timestamp> | <Yes, No, Maybe> | <ID1, ID2, etc.> |

Permission Database
640

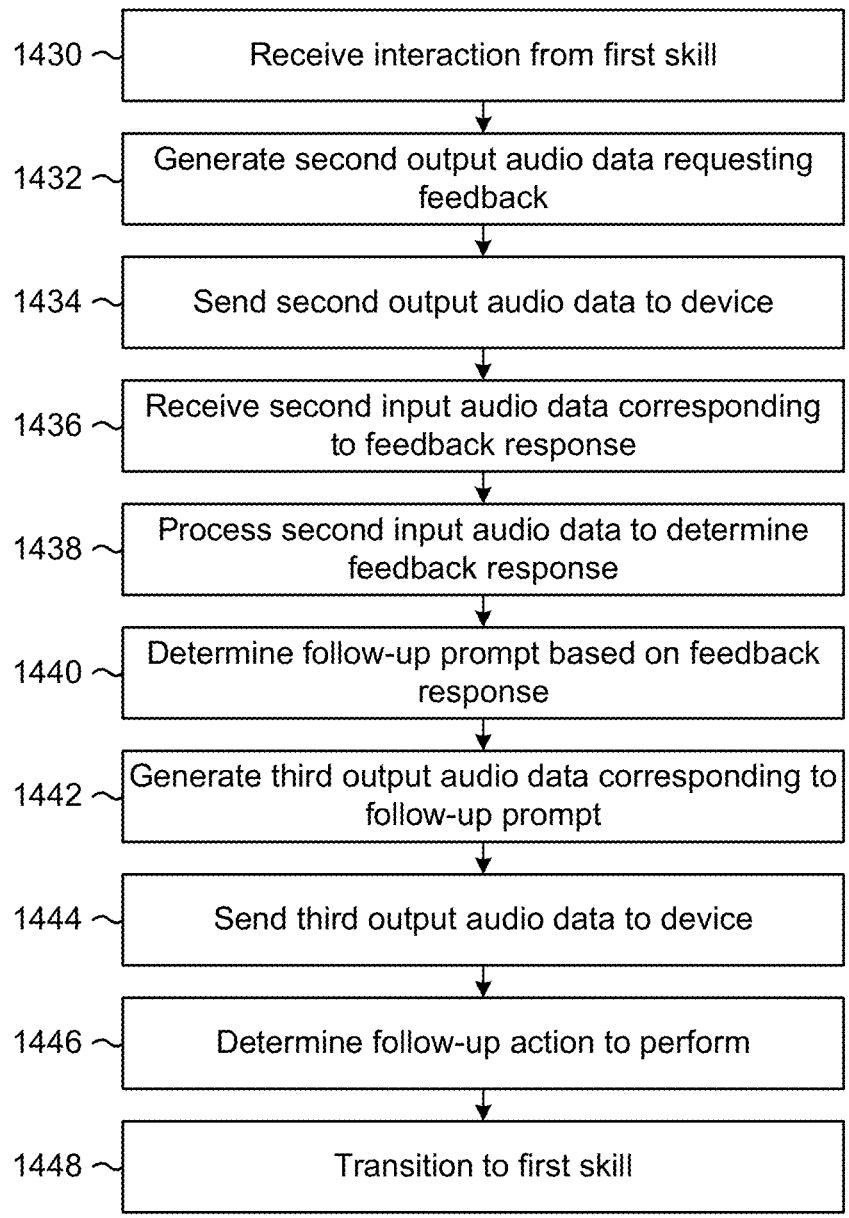

PERMISSIONING FOR NATURAL LANGUAGE PROCESSING SYSTEMS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 7 is a conceptual diagram illustrating an example of requesting feedback and consent.

FIG. 8 illustrates examples of a follow-up prompt database and a follow-up action database.

FIGS. 9A-9B are conceptual diagrams illustrating an example of requesting feedback and then requesting consent based on the feedback response.

FIG. 10 illustrates examples of expected behavior based on a user response.

FIG. 13 illustrates an example of information included in a permission database.

FIGS. 14A-14E are flowcharts conceptually illustrating an example method for requesting feedback and consent.

DETAILED DESCRIPTION

Figure 1:
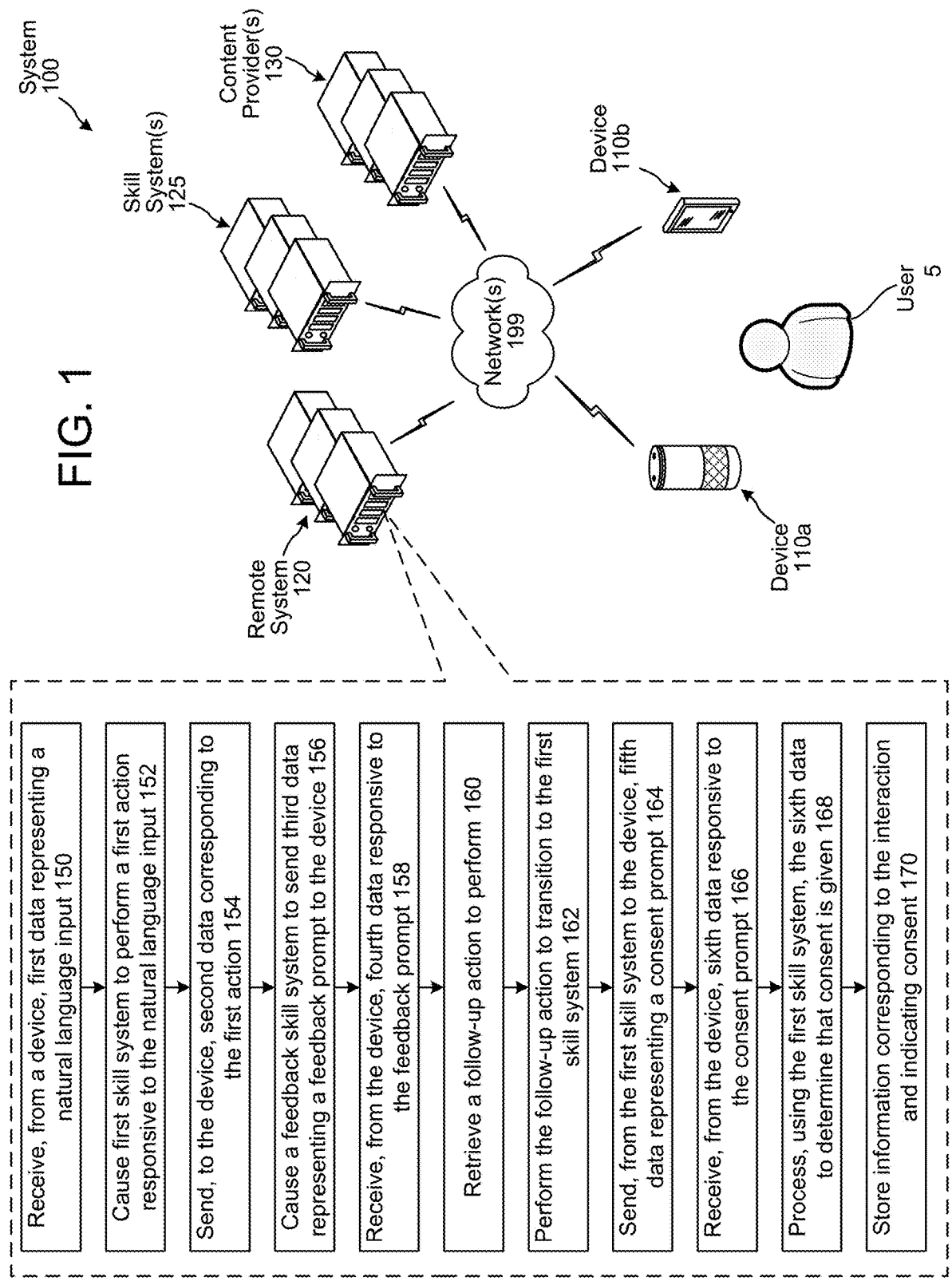
FIG. 1 is a conceptual diagram illustrating a system configured to request feedback and consent.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech.

A system may cause skill systems to perform actions in response to natural language inputs (e.g., spoken inputs and/or typed inputs). For example, for the natural language input "play Adele music," a music skill system may be invoked to output music sung by an artist named Adele. For further example, for the natural language input "turn on the lights," a smart home skill system may be invoked to turn on "smart" lights associated with a user's profile. In another example, for the natural language input "what is the weather," a weather skill system may be invoked to output weather information for a geographic location corresponding to the device that captured the natural language input. In the foregoing examples, actions correspond to the outputting of music, turning on of "smart" lights, and outputting of weather information. As such, as used herein, an "action" may refer to some result of a skill system's processing.

A system may receive a natural language input, process the natural language input to determine an action to be performed that is responsive to the natural language input, and invoke a skill system to perform the action. In some examples, after the action is performed, the system may request feedback indicating whether the action was responsive to the natural language input. If the action is not responsive to the natural language input, the system may generate training data encompassing the interaction (e.g., natural language input, action performed, etc.) in order to improve an accuracy of the system in the future. In some examples, the natural language input may be associated with public information (e.g., general knowledge, etc.), enabling the system to generate the training data without compromising privacy protection or exposing personal data. However, in other examples the natural language input may be associated with sensitive information or personal data.

To improve privacy protection, the present disclosure improves such systems by providing a mechanism for requesting consent from a user prior to generating training data or otherwise using the natural language input and/or the action performed. For example, the system may process the natural language input using a first skill that has first permissions to authorize private data. To request feedback from the user, the system may pass the interaction from the first skill to a feedback skill configured to render a feedback prompt and receive a feedback response. The feedback skill may identify a type of feedback represented by the feedback response and perform an action corresponding to the type of feedback. For example, if the feedback response indicates that a system response generated by the first skill was not responsive to the natural language input, the feedback skill may cause the first skill to render a consent prompt requesting permission to share interaction data (e.g., natural language input, system response, feedback response, etc.) with a second skill, human, and/or other component. Thus, the system may request permission to generate training data in order to improve the first skill and/or other speech processing component based on the interaction.

FIG. 1 illustrates an example of a system 100 configured to request feedback and consent. Although the figures and discussion of the present disclosure illustrate certain steps in a particular order, the steps described may be performed in a different order (as well as certain steps removed or added) without departing from the present disclosure. As shown in FIG. 1, the system 100 may include one or more devices (110a/110b) local to a user 5, a natural language processing (NLP) remote system 120, one or more skill system(s) 125, and one or more content provider(s) 130. As illustrated, the one or more devices (110a/110b), the remote system 120, the skill system(s) 125, and the content provider(s) 130 may communicate across one or more networks 199. While the user 5 is illustrated as being a human, other types of users (e.g., computing systems) may exist. Moreover, while the skill system(s) 125 and content provider(s) 130 are separately illustrated, it will be appreciated that functionality, provided by the content provider(s) 130, may be implemented as part of a skill system 125, in at least some examples.

FIG. 1 includes a process flow illustrating how the remote system 120 may request feedback and consent. At some point, the device 110a may receive audio corresponding to a spoken natural language input originating from the user 5. The device 110a may generate audio data corresponding to the audio and may send the audio data to the remote system 120. Alternatively, the device 110b may receive a typed natural language input from the user 5. The device 110b may generate text data corresponding to the typed input and may send the text data to the remote system 120.

The device 110 may send the audio data and/or the text data to the remote system 120 via an application that is installed on the device 110 and associated with the remote system 120. An example of such an application is the Amazon Alexa application that may be installed on a smart phone, tablet, or the like.

As illustrated in FIG. 1, the remote system 120 may receive (150), from a device 110, first data representing a natural language input. The first data may be audio data or text data sent from the device 110a and/or 110b, although the disclosure is not limited thereto.

The remote system 120 may cause (152) a first skill system 125 to perform a first action responsive to the natural language input and send (154), to the device, second data corresponding to the first action. For example, for the natural language input "play Adele music," the skill system 125 may cause the device (110a/110b) to output music sung by an artist named Adele. As a further example, for the natural language input "turn on the lights," the skill system 125 may cause "smart" lights, associated with the user 5's profile, to be turned on. In another example, for the natural language input "what is the weather," the skill system 125 may cause the device (110a/110b) to output weather information (for a geographic location corresponding to the device (110a/110b) or represented in the user 5's profile). One skilled in the art will appreciate that the remote system 120 may receive various natural language inputs and, thus, that the foregoing pairings of natural language user inputs and actions are merely illustrative.

In some examples, the first skill system may correspond to personal data that is unique to a user profile and therefore associated with privacy protection. For example, the natural language input may correspond to a user query (e.g., "Alexa, when is my doctor's appointment?") and the first skill system 125 may cause the device (110a/110b) to output a system response representing synthesized speech (e.g., "Here's what I found: doctor appointment is at 5 p.m. on your calendar.").

After sending the second data to the device 110, the remote system 120 may cause (156) a feedback skill system to send third data representing a feedback prompt (e.g., "Did that answer your question?") to the device 110. For example, the first skill system may pass the interaction/dialog to the feedback skill system and the feedback skill system may generate the third data and send the third data to the device 110.

The remote system 120 may prompt for feedback using a variety of techniques known to one of skill in the art. For example, the remote system 120 may determine to request feedback based on one or more input signals (e.g., audio data, image data, button presses, etc.), detecting an input while the device 110 is generating output audio, detecting multiple inputs within a short duration of time (e.g., rapid button presses), determining that multiple user queries are similar and/or a user query is repeated, and/or the like.

In some examples, the system 100 may estimate a user satisfaction based on a user's voice and/or behavior and may request feedback when the user appears dissatisfied or frustrated. For example, the system 100 may detect changes in a volume level of input audio (e.g., increased volume level), changes in a rate of speech (e.g., faster speech), a barge-in event (e.g., input detected while the device 110 is generating the output audio), repeated or similar user queries (e.g., user repeating a previous request or asking a similar request within a short period of time), multiple inputs within a short duration of time (e.g., rapid button presses), changes in behavior (e.g., animated motions represented in image data), and/or the like, although the disclosure is not limited thereto.

In some examples, the remote system 120 may prompt for feedback based on other inputs. For example, the remote system 120 may determine that a user query corresponds to a first action that is associated with a high error rate for other users. Additionally or alternatively, the remote system 120 may prompt for feedback periodically or intermittently without departing from the disclosure. For example, the remote system 120 may request feedback based on a first number of interactions (e.g., every tenth user query), a duration of time of time (e.g., request feedback once a day, once a week, etc.), a type of user query (e.g., request feedback upon receiving a new type of user query), and/or the like.

In some examples, the system 100 may control how frequently feedback is requested (e.g., perform rate limiting). For example, the system 100 may limit an overall number of times that feedback is requested, a rate at which feedback is requested, a number of times that feedback is requested within a duration of time, and/or the like without departing from the disclosure.

The remote system 120 (e.g., the feedback skill system) may receive (158), from the device, fourth data responsive to the feedback prompt (e.g., "No"), may retrieve (160) a follow-up action to perform, and may perform (162) the follow-up action to transition back to the first skill system. As described in greater detail below, the follow-up action indicates how the remote system 120 should proceed with the dialog after receiving feedback, and may depend on the type of feedback. For example, if the feedback (e.g., fourth data) corresponds to positive feedback (e.g., "Yes, that answered my question"), the system 100 may do nothing and end the dialog after step 160. However, if the feedback corresponds to negative feedback (e.g., "No, that didn't answer my question"), then the system 100 may transition the dialog from the feedback skill system to the first skill system and continue the dialog.

In some examples, the system 100 may use the dialog in training in order to improve a future user experience. For example, the system 100 may detect negative feedback and use the dialog as a negative training example to train a model or otherwise improve the system response. However, the disclosure is not limited thereto and the system 100 may use positive feedback to train the model without departing from the disclosure. If the dialog corresponds to general information, public information, and/or the like that is not specific to the user (e.g., not private information or personal data), the system 100 may use the dialog for training without requesting consent from the user. However, when the dialog includes private information, personal data, or information that is considered sensitive, the system 100 may request consent before using the dialog for training.

In some examples, the system 100 may determine that the dialog includes private information and that the system 100 must request permission to perform additional processing using the dialog using various techniques known to one of skill in the art. For example, the system 100 may determine that permission is needed when the dialog is associated with a particular skill, intent, and/or domain, when the dialog invokes confidential information, when certain entities or keywords are represented in the dialog, and/or the like. In some examples, the system 100 may determine that permission is needed based on the particular skill, intent, and/or domain. For example, the system 100 may request permission before performing the additional processing using any dialog that is associated with a particular skill/intent/domain. In other examples, the system 100 may perform speech processing and analyze the input data (e.g., user query) or the output data (e.g., system response) to determine whether permission is needed based on the content of the dialog (e.g., semantic meaning of the utterance or the system response). For example, the system 100 may that detect particular keywords, entities, and/or the like are represented in at least one of the input data or the output data without departing from the disclosure.

As illustrated in FIG. 1, the follow-up action may cause the first skill system to perform a secondary action, such as generate a consent prompt that requests permission to use the interaction to improve future results. Thus, the remote system 120 may send (164), from the first skill system to the device 110, fifth data representing the consent prompt.

In some examples, the system 100 may control how frequently the system 100 requests permission or consent (e.g., perform rate limiting). For example, the system 100 may limit an overall number of times that permission is requested, a rate at which permission is requested, a number of times that permission is requested within a duration of time, and/or the like without departing from the disclosure.

The remote system 120 may receive (166), from the device, sixth data responsive to the consent prompt, may process (168), using the first skill system, the sixth data to determine that consent is given, and may store (170) information corresponding to the interaction and indicating consent is granted. For example, the remote system 120 may store the permission information indicating that the consent was given in a permission database, as described in greater detail below with regard to FIG. 6, although the disclosure is not limited thereto. In some examples, the remote system 120 may store the permission information along with interaction data (e.g., first data, second data, third data, fourth data, etc.) associated with the natural language input and corresponding system response, although the disclosure is not limited thereto.

The remote system 120 may then use the permission information and/or interaction data to generate training data and train the first skill system using the training data. Thus, the remote system 120 may explicitly request consent from the user to use the interaction data to improve the first skill system and/or other speech processing component, protecting personal data and improving privacy protection associated with the user profile. If consent is not given, the remote system 120 may discard the interaction data and not generate training data.

The permission information may indicate that a skill and/or component is granted access to data (e.g., interaction data, although the disclosure is not limited thereto). Thus, the permission information indicates that the skill/component is granted permission to access specific data (e.g., individual utterance or system response) for which consent has been explicitly requested. For example, a first skill may be associated with a first domain corresponding to a first level of sensitivity (e.g., public knowledge accessible to every skill/component), while a second skill may be associated with a second domain corresponding to a second level of sensitivity (e.g., personal information accessible only to select skills/components). The first skill may not access data associated with the second level of sensitivity without requesting permission to access specific data. When the remote system 120 generates a consent prompt and receives a consent response granting permission, this enables the first skill to access the specific data that is associated with the consent response.

Figure 2:
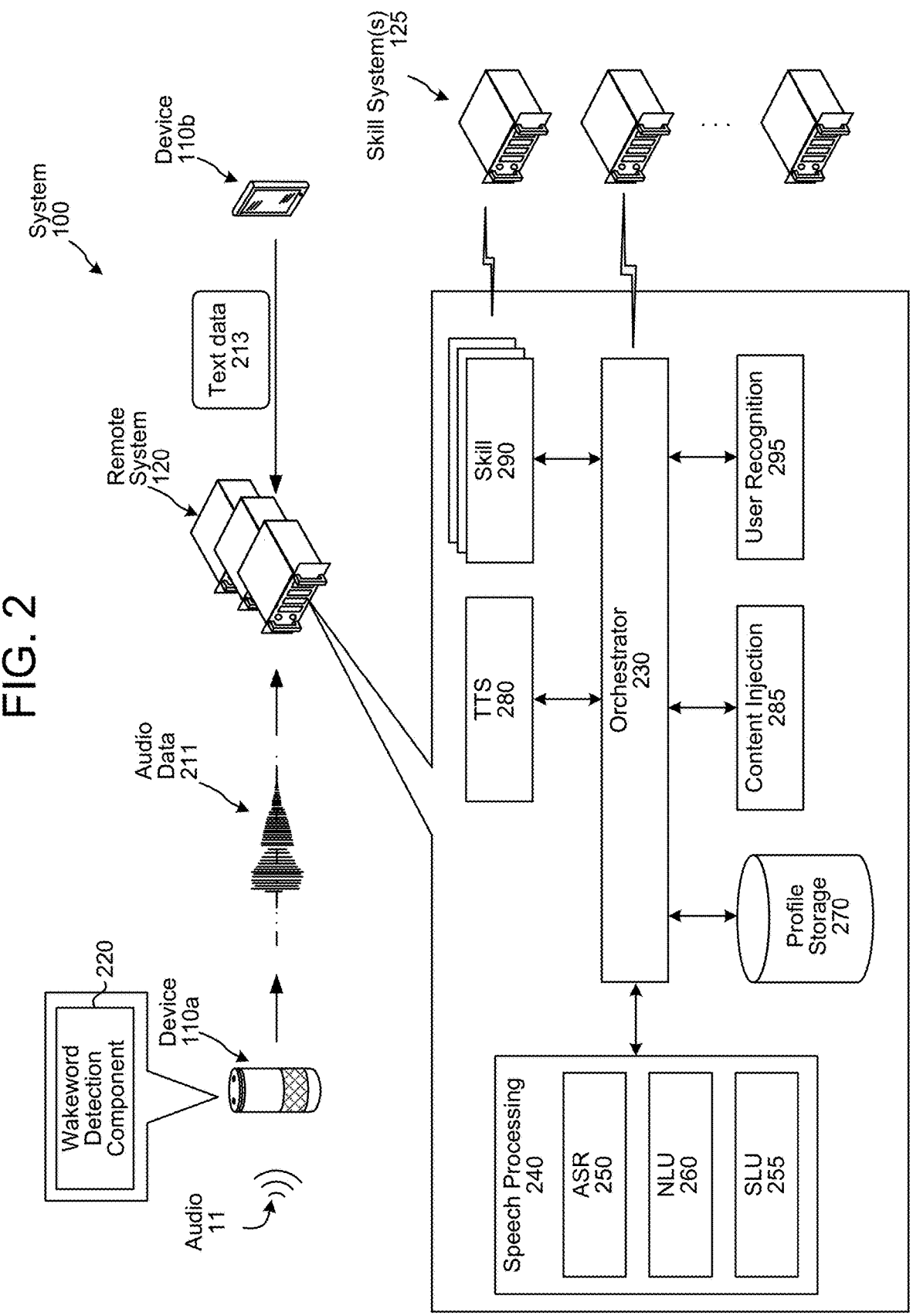
FIG. 2 is a conceptual diagram of components of the system.

The system 100 may operate using various components as described in FIG. 2. The various components may be located on a same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the remote system 120. As indicated previously, the device 110a may be configured to detect various wakewords, with each wakeword corresponding to a different assistant. In at least some examples, a wakeword may correspond to a name of an assistant. An example wakeword/assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once a wakeword is detected, the device 110a may "wake" and begin transmitting audio data 211, representing the audio 11, to the remote system 120. The audio data 211 may include data corresponding to the detected wakeword, or the device 110a may remove the portion of the audio corresponding to the detected wakeword prior to sending the audio data 211 to the remote system 120.

The remote system 120 may include an orchestrator component 230 configured to receive the audio data 211 (and optionally and assistant identifier) from the device 110a. The orchestrator component 230 may send the audio data 211 to a speech processing component 240. In some examples, the speech processing component 240 may include an ASR component 250 and an NLU component 260 that are configured to process the audio data 211 to generate NLU data. However, the disclosure is not limited thereto and in other examples, the speech processing component 240 may include a spoken language understanding (SLU) component 255 that is configured to process the audio data 211 to generate the NLU data. Additionally or alternatively, the speech processing component 240 may include the ASR component 250, the NLU component 260 and/or the SLU component 255 without departing from the disclosure.

The ASR component 250 transcribes the audio data 211 into ASR results data (e.g., text data) include one or more ASR hypotheses (e.g., in the form of an N-best list). Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

The device 110b may receive a typed natural language input. The device 110b may generate text data 213 representing the typed natural language input. The device 110b may send the text data 213 to the remote system 120, wherein the text data 213 is received by the orchestrator component 230.

The orchestrator component 230 may send text data (e.g., text data output by the ASR component 250 or the received text data 213) to an NLU component 260.

The orchestrator component 230 (or other component) may also track a dialog and dialog state across multiple utterances. A dialog is an exchange between the user and the system where the user speaks a command and the system executes it. While many dialogs involve a single utterance, many dialogs may involve many different utterances to ultimately execute the action called for by the user. For example, if the user asks the system to order a pizza, the system may invoke a pizza ordering skill and may prompt the user several times for several utterances to obtain the data from the user needed to complete the pizza order (e.g., toppings, time of delivery, any additional items to order, etc.). Another example may be the user invoking a quiz game skill, where multiple questions are asked of the user and the user responds with utterances that are processed by the system and whose text data is sent to the quiz show skill. Each utterance of the dialog may have a unique utterance ID but may also share a common dialog ID so that the system can process incoming audio data knowing that it is associated with a particular dialog.

The remote system 120 may store dialog data indicating the dialog ID and a variety of other information, including input audio data representing an utterance, output audio data representing synthesized speech, first text data corresponding to the utterance, second text data corresponding to the synthesized speech, and/or other information without departing from the disclosure. As used herein, an exchange refers to at least one input and at least one output responsive to the input. Thus, a single exchange may include one or more inputs and one or more outputs, and the dialog may correspond to two or more exchanges without departing from the disclosure. For ease of illustration, an exchange may be referred to as an interaction without departing from the disclosure.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device (110a/110b), the remote system 120, a skill system 125, etc.) to execute the intent. For example, if the text data corresponds to "play Adele music," the NLU component 260 may determine a <PlayMusic> intent and may identify "Adele" as an artist. For further example, if the text data corresponds to "what is the weather," the NLU component 260 may determine an <OutputWeather> intent. In another example, if the text data corresponds to "turn off the lights," the NLU component 260 may determine a <DeactivateLight> intent.

The NLU component 260 may output NLU results data (which may include tagged text data, indicators of intent, etc.) to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

As described above, the remote system 120 may perform speech processing using two different components (e.g., the ASR component 250 and the NLU component 260). One skilled in the art will appreciate that the remote system 120, in at least some examples, may implement a spoken language understanding (SLU) component 255 that is configured to process audio data 211 to generate NLU results data without departing from the disclosure.

In some examples, the SLU component 255 may be equivalent to the ASR component 250 and the NLU component 260. While the SLU component 255 may be equivalent to a combination of the ASR component 250 and the NLU component 260, the SLU component 255 may process audio data 211 and directly generate the NLU results data, without an intermediate step of generating text data (as does the ASR component 250). As such, the SLU component 255 may take audio data 211 representing speech and attempt to make a semantic interpretation of the speech. That is, the SLU component 255 may determine a meaning associated with the speech and then implement that meaning. For example, the SLU component 255 may interpret audio data 211 representing speech from the user 5 in order to derive a desired action. In some examples, the SLU component 255 outputs a most likely NLU hypothesis, or multiple NLU hypotheses in the form of a lattice or an N-best list with individual NLU hypotheses corresponding to confidence scores or other scores (such as probability scores, etc.).

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the remote system 120 that is akin to a software application running on a traditional computing device. That is, a skill component 290 may enable the remote system 120 to execute specific functionality in order to perform one or more actions (e.g., provide information to a user, display content to a user, output music, or perform some other requested action). The remote system 120 may be configured with more than one skill component 290. For example, a weather skill component may enable the remote system 120 to provide weather information, a ride sharing skill component may enable the remote system 120 to schedule a trip with respect to a ride sharing service, a restaurant skill component may enable the remote system 120 to order food with respect to a restaurant's online ordering system, a communications skill component may enable the system to perform messaging or multi-endpoint communications, etc. A skill component 290 may operate in conjunction between the remote system 120 and other devices such as the device 110 or skill system(s) 125 in order to complete certain functions. Inputs to a skill component 290 may come from various interactions and input sources.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the remote system 120 (as illustrated in FIG. 2) or may be located at whole (or in part) with one or more separate systems. Unless expressly stated otherwise, reference to a skill, skill device, or skill component may include a skill component operating within the remote system 120 (for example as skill component 290) and/or skill component operating within a system separate from the remote system 120.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the remote system 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills and may optionally be in communication with one or more skill system(s) 125. The skill system(s) 125 may each correspond to a particular skill component 290 and may be capable of performing operations to ultimately execute an action. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill. In some instances, skill component(s) 290 or a skill system(s) 125 may provide output text data responsive to the present user command.

The remote system 120 may communicate with one or more skill systems 125. A skill system 125 may be configured to execute with respect to NLU results data. For example, for NLU results data including a <GetWeather> intent, a weather skill system may determine weather information for a geographic location represented in a user profile or corresponding to a location of the device 110 that captured a corresponding natural language input. For further example, for NLU results data including a <BookRide> intent, a taxi skill system may book a requested ride. In another example, for NLU results data including a <BuyPizza> intent, a restaurant skill system may place an order for a pizza. A skill system 125 may operate in conjunction between the remote system 120 and other devices, such as the device 110, in order to complete certain functions. Inputs to a skill system 125 may come from speech processing interactions or through other interactions or input sources.

A skill system 125 may be associated with a domain. A non-limiting list of illustrative domains includes a smart home domain, a music domain, a video domain, a flash briefing domain, a shopping domain, and/or a custom domain.

The remote system 120 may include a TTS component 280. The TTS component 280 may generate audio data (e.g., synthesized speech) from text data using one or more different methods. Text data input to the TTS component 280 may come from a skill system 125, the orchestrator component 230, or another component of the system 100.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The remote system 120 may include a user recognition component 295. In at least some examples, the user recognition component 295 may be implemented as a skill system 125. Additionally or alternatively, the user recognition component 295 may be included as part of the speech processing component 240, although the disclosure is not limited thereto. In some examples, a portion of the user recognition component 295 (e.g., voice recognition, speaker recognition, etc.) may be included as part of the speech processing component 240 without departing from the disclosure.

The user recognition component 295 may recognize one or more users using various data. The user recognition component 295 may take as input the audio data 211 and/or the text data 213. The user recognition component 295 may perform user recognition (e.g., user recognition processing) by comparing speech characteristics, in the audio data 211, to stored speech characteristics of users. The user recognition component 295 may additionally or alternatively perform user recognition by comparing biometric data (e.g., fingerprint data, iris data, etc.), received by the remote system 120 in correlation with a natural language input, to stored biometric data of users. The user recognition component 295 may additionally or alternatively perform user recognition by comparing image data (e.g., including a representation of at least a feature of a user), received by the remote system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill system 125, as well as processing performed by other components of the remote system 120 and/or other systems.

The remote system 120 may include profile storage 270. The profile storage 270 may include a variety of information related to individual users, groups of users, devices, etc. that interact with the remote system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information. Data of a profile may additionally or alternatively include information representing a preferred assistant to respond to natural language inputs corresponding to the profile.

The profile storage 270 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill systems 125 that the user has enabled. When a user enables a skill system 125, the user is providing the remote system 120 with permission to allow the skill system 125 to execute with respect to the user's natural language inputs. If a user does not enable a skill system 125, the remote system 120 may not invoke the skill system 125 to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

The remote system 120 may additionally include a content injection component 285. The content injection component 285 may be invoked at runtime to determine when injected content is to be output, as well as determine what injected content is to be output in a specific situation.

Figure 3:
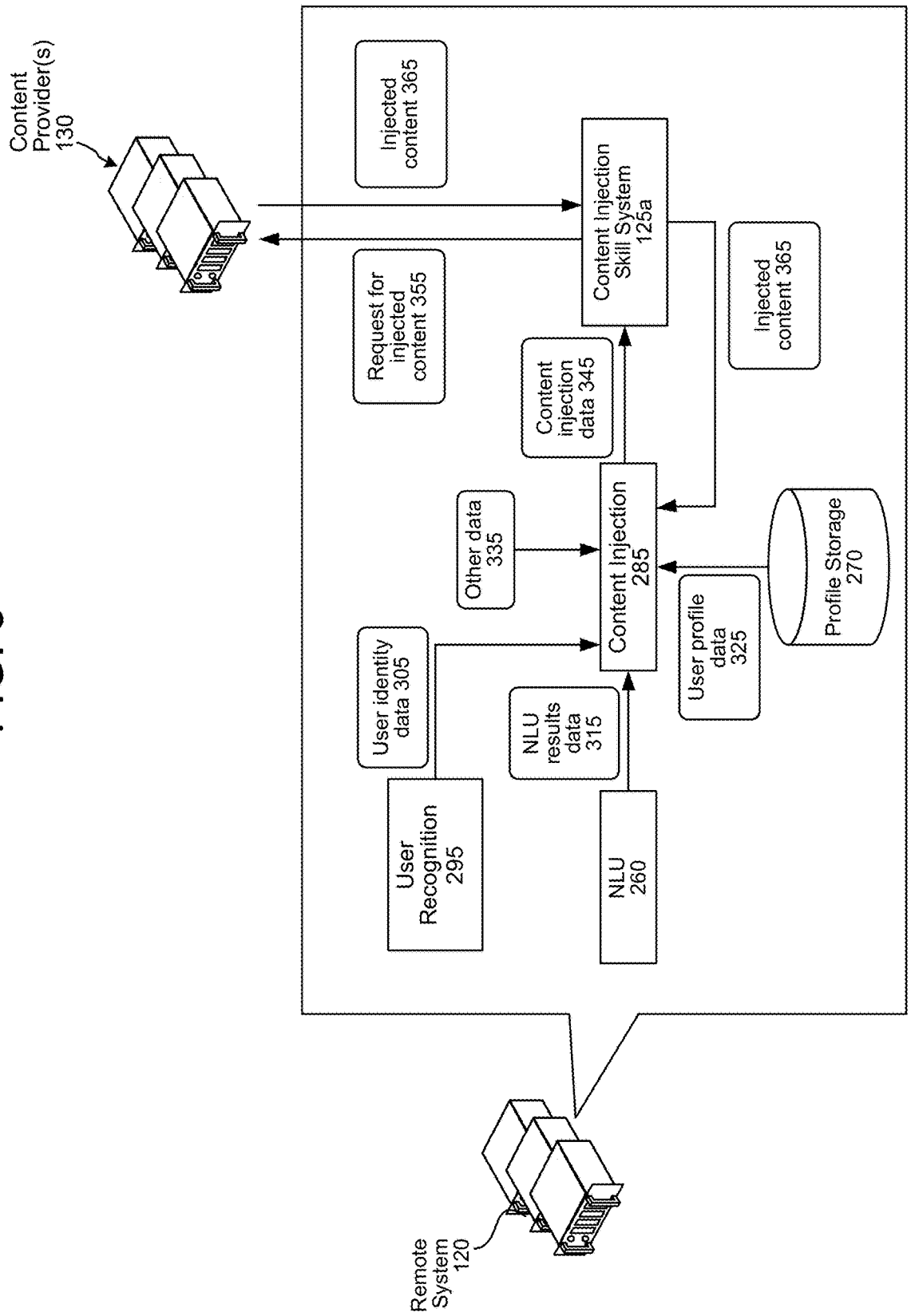
FIG. 3 is a conceptual diagram illustrating how a content injection component may determine when injected content (e.g., content associated with but not directly responsive to a natural language input) should be output.

FIG. 3 illustrates how the content injection component 285 may determine when injected content (e.g., associated with but not directly responsive to a natural language input) should be output. As illustrated, the various components in FIG. 3 communicate directly. It will be appreciated that some or all of the components illustrated in FIG. 3 may communicate through the orchestrator component 230. In addition, while FIG. 3 illustrates a dedicated content injection component 285, it will be appreciated that some or all of the processes performed by the content injection component 285 disclosed herein may be performed by one or more other components of the remote system 120, such as the orchestrator component 230.

Each time the NLU component 260 outputs NLU results data 315, the NLU results data 315 may be sent to the content injection component 285. The content injection component 285 may determine whether injected content, associated with but not directly responsive to the natural language input represented by the NLU results data 315, should be output to the natural language input-originating user 5.

The content injection component 285 may base its determinations at least in part on non-user specific data, such as skill system 125 provided data.

The content injection component 285 may determine whether injected content should be output based at least in part on information accompanying data responsive to a natural language input and provided to the remote system 120 by a skill system 125. Such information is represented as other data 335 in FIG. 3. In addition to providing the remote system 120 with data responsive to a natural language input, a skill system 125 may provide the remote system 120 with presentation framework data indicating, for example, the types of content (e.g., audio, image, video, etc.) represented in the data (responsive to the natural language input) as well as one or more devices associated with the natural language input-originating user 5 that should be used to output the different types of content. The presentation framework data may, in at least some examples, include information indicating the remote system 120 should determine injected content. When the presentation framework data includes such information, the content injection component 285 may determine injected content should be output. In at least some other examples, such information may simply be an input into a model run by the content injection component 285 for determining when injected content is to be output.

The content injection component 285 may determine whether injected content should be output based at least in part on data that is provided to the remote system 120 by a skill system 125, but which does not accompany data responsive to a natural language input. Such data is represented as other data 335 in FIG. 3. A skill system 125 may provide the remote system 120 with data indicating that any time the NLU results data 315 includes a particular intent, the content injection component 285 should query the skill system 125 as to whether the skill system 125 has injected content that may be output. For example, a concert ticket skill system may provide the remote system 120 with data indicating that anytime the NLU results data 315 includes a <PlayMusic> intent, the content injection component 285 should query the concert ticket skill system as to whether the concert ticket skill system has access to information indicating a concert put on by an artist represented in the NLU results data 315. For further example, an electronic calendar skill system may provide the remote system 120 with data indicating that anytime the NLU results data 315 includes an <OutputTime> intent, the content injection component 285 should query the electronic calendar skill system as to whether the electronic calendar skill system has calendar entries associated with an electronic calendar associated with the natural language input-originating device 110 and/or user 5. Yet further, for example, a traffic report skill system may provide the remote system 120 with data indicating that anytime the NLU results data 315 includes a <BookRide> intent, the content injection component 285 should query the traffic report skill system to provide current traffic report information.

The content injection component 285 may determine whether injected content should be output based at least in part on an intent represented in the NLU results data 315. The remote system 120 may store intent pair data (illustrated as other data 335 in FIG. 3) corresponding to pairs of intents. Each pair of intents may be associated with a respective score representing a likelihood that a second natural language input, corresponding to the second intent of the pair, will be received from the same user within a time threshold subsequent to content responsive to the first natural language input being output. The scores of various intent pairs may be normalized. The intent pair data may be untailored with respect to any given user of the system. For example, the intent pair data may include the following intent pairs with corresponding scores:

[0.345]<GetWeather>; <GetTraffic>
[0.217]<OrderPizza>; <PlayMovie>
[0.121]<PlayMusic>; <SetVolume>

The intent pair data may be configured based solely upon the natures of the intents. For example, a pair of intents may include a <PlayMusic> intent and a <ChangeVolume> intent. The pair of intents may be associated with a score representing a likelihood that a user may provide a first natural language input, corresponding to the <PlayMusic> intent, prior to the user inputting a second natural language input, corresponding to the <ChangeVolume> intent, based solely on the <PlayMusic> intent and the <ChangeVolume> intent both relating to the output of audio. For further example, a pair of intents may include a <BookPlaneTicket> intent and a <GetWeather> intent. This pair of intents may be associated with a score indicating a likelihood that users who purchase plane tickets often ask about the weather for their destination.

Intents may also be paired based on system usage history associated with various different users. Pairing of the intents may be skill system agnostic. Thus, a single skill system may be associated with both intents of a pair of intents, or a first intent of a pair may be associated with a first skill system while the second intent of the pair may be associated with a second skill system. For example, a pair of intents may include a <PlayMusic> intent and a <ChangeVolume> intent, where both the <PlayMucic> intent and the <Change Volume> intent correspond to a same music skill system. For further example, a pair of intents may include a <BookPlaneTicket> intent and a <GetWeather> intent, where the <BookPlaneTicket> intent corresponds to a booking skill system and the <GetWeather> intent corresponds to a weather skill system.

Intent pairings may additionally or alternatively be agnostic with respect to the 1P or 3P nature of the skill systems associated with the intents. That is, both of the intents of a pair may be associated with one or more 1P skill systems (e.g., skill systems operated as part of the remote system 120), both of the intents of a pair may be associated with one or more 3P skill systems (e.g., skill systems operated separately from but in communication with the remote system 120), or a first intent of a pair may be associated with a 1P skill system while the second intent of the pair is associated with a 3P skill system. For example, a pair of intents may include a <PlayMusic> intent and a <ChangeVolume> intent, where both the <PlayMusic> intent and the <Change Volume> intent are executed by a 1P skill system. For further example, a pair of intents may include a <PlayMusic> intent and a <ChangeVolume> intent, where both the <PlayMusic> intent and the <Change Volume> intent are executed by a 3P music skill system. For further example, a pair of intents may include a <BookPlaneTicket> intent and a <PlayMusic> intent, where the <BookPlaneTicket> intent is executed by a 3P skill system and the <PlayMusic> intent is executed by a 1P skill system.

Intent pair data may additionally or alternatively be user specific. For example, if a user routinely provides a natural language input, corresponding to a <ChangeVolume> intent, subsequent to providing a natural language input corresponding to a <PlayMusic> intent, the remote system 120 may increase the score associated with a pair of intents corresponding to these intents. Conversely, if the user rarely provides a natural language input, corresponding to a <ChangeVolume> intent, subsequent to providing a natural language input corresponding to a <PlayMusic> intent, the remote system 120 may decrease the score associated with a pair of intents correspond to these intents.

The content injection component 285 may additionally or alternatively base its determinations at least in part on data specific to the user 5 that provided the presently being processed natural language input. Each user may have a different tolerance regarding how many times injected content is output in a given period of time, what kinds of injected content are output, as well as how injected content is presented.

The content injection component 285 may receive user identity data 305 from the user recognition component 295. The user identity data 305 may indicate one or more users that likely provides the presently being processed natural language input. The content injection component 285 may thereafter query the profile storage 270 for user profile data 325 specific to the user that most likely provided the presently being processed natural language input.

The user profile data 325 may indicate a maximum number of times the user 5 has indicated the remote system 120 may output injected content in a specific period of time (e.g., twice/hour, ten (10) times/day, etc.). The maximum number of times may be irrespective to any specific skill system 125, entity and/or represented in the NLU results data 315, or the like. For example, the user profile data 325 may indicate the remote system 120 may output injected content a maximum of ten (10) times a day. If the content injection component 285 determines the remote system 120 has output injected content to the user 5 less than ten (10) times during a calendar day in which the present natural language input was received, the content injection component 285 may generate content injection data 345 indicating injected content should be output in conjunction with a response to the present natural language input. If the content injection component 285 determines the system has already output injected content to the user 5 ten (10) times during the calendar data in which the present natural language input was received, the content injection component 285 may not generate content injection data 345, thereby ending processing with respect to the output of injected content and thereby resulting in injected content not being output (in conjunction with content responsive to the present natural language input) by the remote system 120.

The user profile data 325 may additionally or alternatively indicate a user preference regarding how often (e.g., a frequency) injected content associated with a content type may be output in a specific amount of time. Additionally or alternatively, the user profile data 325 may indicate a user preference regarding how often injected content may be output in a specific amount of time with respect to a content type corresponding to a natural language input. Content types include, but are not limited to, songs, news information, videos, concert ticket offers, shopping discounts, and newly available skill systems. For example, a first user preference of a first user may indicate injected content corresponding to songs may be output up to ten (10) times a day, whereas a second user preference of a second user may indicate injected content corresponding to songs may be output up to two (2) times a week. For further example, a first user preference of a first user may indicate injected content may be output with regarding up to ten (10) natural language inputs corresponding to requests to play music in a single day whereas a second user preference of a second user may indicate injected content may be output regarding up to two (2) natural language inputs corresponding to requests to play music in a single a week.

The user profile data 325 may additionally or alternatively indicate a user preference regarding the times at which the user 5 permits the remote system 120 to output injected content. For example, a user preference may indicate the remote system 120 is permitted to output a first amount of injected content over the duration of a morning, and is permitted to output a second amount of injected content over the duration of an evening. The content injection component 285 may determine a time representing when the presently being processed natural language input was received (with such time be represented in, for example, the other data 335). If the content injection component 285 determines the remote system 120 has output injected content to the user 5 less times than permitted (as indicated by the user preference) for the time corresponding to receipt of the present natural language input, the content injection component 285 may generate content injection data 345. If the content injection component 285 determines the remote system 120 has already output injected content a number of permitted times (as indicated by the user preference) for the time corresponding to when the present natural language input was received, the content injection component 285 may not generate content injection data 345.

The user profile data 325 may additionally or alternatively indicate a user preference regarding the types of natural language inputs with respect to which the user 5 permits, as well as does not permit, the remote system 120 to output injected content. For example, the user preference may indicate the remote system 120 may output injected content when the natural language input corresponds to a request to play music. For further example, the user preference may indicate the remote system 120 may not output injected content when the natural language input corresponds to a request to purchase a product using a shopping skill system. If the content injection component 285 determines an intent (included in NLU results data 315 representing a present natural language input) corresponds to one with respect to which the remote system 120 is permitted (as indicated by the user preference) to output injected content, the content injection component 285 may generate content injection data 345. If the content injection component 285 determines an intent (included in NLU results data 315 representing a present natural language input) corresponds to one with respect to which the remote system 120 is not permitted (as indicated by the user preference) to output injected content, the content injection component 285 may not generate content injection data 345.

The user profile data 325 may additionally or alternatively indicate various characteristics of the user 5. The user profile data 325 may indicate an age of the user 5, as users of different ages may be receptive to receiving different amounts and/or kinds of injected content. The user profile data 325 may additionally or alternatively indicate a culture of the user 5, as users of different cultures may be receptive to receiving different amounts and/or kinds of injected content. The user profile data 325 may additionally or alternatively indicate a geographic region, country, or other geographic location corresponding to the user's residence, as users residing in different geographic locations may be receptive to receiving different amounts and/or kinds of injected content. If the content injection component 285 determines the characteristic(s) of the user 5 indicates injected content should be output, the content injection component 285 may generate content injection data 345. If the content injection component 285 determines the characteristic(s) of the user 5 indicates injected content should not be output, the content injection component 285 may not generate content injection data 345.

The user profile data 325 may additionally or alternatively indicate a user preference regarding entities, represented in NLU results data 315, with respect to which injected content may be output. For example, a user preference may indicate the remote system 120 may output injected content when the NLU results data 315 includes an entity corresponding to a particular sports team. For further example, a user preference may indicate the remote system 120 may not output injected content when the NLU results data 315 includes an entity corresponding to a celebrity. If the content injection component 285 determines at least one entity, represented in the NLU results data 315, corresponds to an entity with respect to which a user preference indicates injected content may be output, the content injection component 285 may generate content injection data 345. If the content injection component 285 determines at least one entity, represented in the NLU results data 315, corresponds to an entity with respect to which a user preference indicates injected content should not be output, the content injection component 285 may not generate content injection data 345.

The other data 335 may indicate a region, country, or other geographic location of the natural language input originating-device 110, as users interacting with devices 110 located in different geographic locations may be receptive to receiving different amounts and/or kinds of injected content. If the content injection component 285 determines the geographic location of the natural language input-originating device 110 indicates injected content may be output, the content injection component 285 may generate content injection data 345. If the content injection component 285 determines the geographic location of the natural language input-originating device 110 indicates injected content should not be output, the content injection component 285 may not generate content injection data 345.

The other data 335 may additionally or alternatively include information representing the natural language input originating-user's system usage history. The user's system usage history may represent instances of previous input natural language inputs, ASR results data, NLU results data, as well as other processing results data. The content injection component 285 may determine one or more trends in the natural language input originating-user's system usage history. For example, the content injection component 285 may determine the user 5 routinely provides a natural language input, requesting output of weather information for a location, immediately following output of content responsive to a natural language input requesting a flight be booked to the location. The content injection component 285 may additionally or alternatively determine whether a current context (e.g., ASR results data representing the current natural language input, NLU results representing the current natural language input, etc.) correspond to any of the determined trends. If the content injection component 285 determines the current context corresponds to at least one trend, the content injection component 285 may generate content injection data 345.

The other data 335 may additionally or alternatively represent previously provided user feedback indicating the appropriateness of previously output injected content. The other data 335 may additionally or alternatively include social media data associated with the user, system usage history associated with the user, a history of music listened to by the user, a history of books purchased by the user, a general purchasing history of the user, a browsing history of the user, a travel history of the user, information from the user's electronic calendar, etc.

The content injection component 285 may run one or more machine learned models that may take as input one or more of the data/information detailed above, and determine whether injected content should be output (e.g., determine whether content injection data 345 should be generated). The model(s) run by the content injection component 285 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component, such as the content injection component 285, requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The model(s) run by the content injection component 285 may include skill system-specific rules. Thus, if the NLU results data 315 is associated with a specific skill system, the model(s) may execute skill system-specific rules that are associated with the skill system to which the NLU results data 315 is associated. For example, the model(s) may include music skill system-specific rules that indicate injected content should never be output when the music skill system is represented in NLU results data 315 since the output of the music skill system is long form music content.

In examples where a single model having skill system-specific portions is implemented, a portion of the model(s) specific to one or more skill systems may be considered static because the portion may remain constant overtime.

The model(s) run by the content injection component 285 may additionally or alternatively be personalized to the natural language input-originating user, at runtime. That is, the model(s) may be trained to consider a variety of information and, at runtime, the content injection component 285 may run the model(s) with respect to a variety of information specific to the natural language input-originating user 5.

A user may provide the remote system 120 with feedback regarding the appropriateness of output injected content. Such feedback may be positive or negative. Moreover, a user may provide feedback to the remote system 120 by speaking the feedback to the device 110a, by interacting with a touchscreen of the device 110b, by performing a gesture (e.g., thumbs up, thumbs down, etc.) that is captured by a camera of the device (110a/110b), etc. The remote system 120 may train or retrain the model(s), implemented by the content injection component 285, using the provided feedback so the content injection component 285 does not determine injected content should be output if the current context corresponds to a previous instance where the provided feedback indicated the injected content was not applicable to the user or otherwise inappropriate/unnecessary from the user's perspective.

The content injection component 285 may compile all applicable other data 335 and user preferences, represented as the user profile data 325 in FIG. 3, into a multi-dimensional feature vector. The content injection component 285 may impose a feature vector dimension threshold to determine whether to run the machine learned model(s) or to use default rules with respect to when injected content should be output. It will be appreciated that the more user-specific dimensions a feature vector has, the more user specific the output of the model(s) may be. It will also be appreciated that running a model(s) may be operationally intensive. Thus, the feature vector dimension threshold may be configured at a value representing a diminishing return of user-specific model(s) output. That is, if the multi-dimensional feature vector includes a number of dimensions not satisfying (e.g., falling below) the feature vector dimension threshold, the reliability of a user-specific model(s) output based on the multi-dimensional feature vector does not outweigh the operational intensity of running the model(s).

The default rules for determining when injected content should be output may be configured with respect to a default user. For example, the default rules may be based on the culture of a default user, the geographic location (e.g., country, region, etc.) of a default user, the maximum number of times a default user would permit the remote system 120 to output injected content in a specific period of time, etc.

The content injection component 285 may generate and output content injection data 345 indicating injected content should be output. The content injection component 285 may send the content injection data 345 to a contention generation skill system 125a configured to determine injected content associated with but not directly responsive to the current natural language input. The content injection data 345 may include at least a portion of the NLU results data 315, and optionally at least a portion of the user profile data 325 and/or at least a portion of the other data 335.

The content injection data 345 may indicate a specific skill system 125 that should be queried for injected content. As described above, a skill system 125 may provide the remote system 120 with data indicating that any time the NLU results data 315 indicate a particular intent, the content injection component 285 should query the skill system 125 as to whether the skill system 125 has injected content that may be output. When the content injection component 285 determines the NLU results data 315 indicate the particular intent, the content injection data 345 may include an indication that the content injection skill system 125a should query the specific skill system 125 for injected content associated with one or more entities represented in the NLU results data 315.

The content injection skill system 125a may determine a content provider 130 from which to receive injected content from based at least in part on the NLU results data 315. For example, the content injection skill system 125a may determine the NLU results data 315 includes a <PlayMusic> intent and "Adele" as an entity. Based thereon, the content injection skill system 125a may determine a concert booking content provider 130 from which to receive injected content from.

The content injection skill system 125a (or, alternatively for example, the orchestrator component 230) may send, to the content provider 130, a request 355 for injected content. In at least some examples, the request 355 may indicate at least a portion of the entities represented in the NLU results data 315 that the content provider 130 may use to determine injected content. The remote system 120, in at least some examples, may determine first output data, responsive to the natural language input, prior to determining the content provider 130 from which to receive injected content. Alternatively, the remote system 120 may determine the content provider 130, from which to receive injected content, after determining the NLU results data 315 but prior to determining the first output data.

The content provider 130 may provide the content injection skill system 125a with injected content 365 associated with but not directly responsive to the natural language input. In at least some examples, the content provider 130 may be unable to determine injected content. In such examples, the content provider 130 may provide the content injection skill system 125a with an indication of such, in which case the contention injection skill system 125a.

The content injection data 345 may, in at least some examples, indicate a modality that injected content should be output in. The modality may be represented in the user profile data 325 input to the content injection component 285. For example, the user profile data 325 may indicate a user preference indicating that the user 5 prefers the remote system 120 to output unresponsive visual content over unresponsive audio content. In such a case, the request 355 may include a request for image data or video data if such can be obtained or generated by the content provider 130.

The content injection component 285 may determine whether injected content should be output while content, responsive to a natural language input, is output by the remote system 120. For example, a device 110 may receive a natural language input to cease output of content responsive to a natural language input while the content is be output. For example, while a song is being output, a user may say "Alexa, cancel." The device 110 may send input data, representing the user's cease output natural language input, to the remote system 120. The remote system 120 may process the input data (e.g., by performing ASR processing and NLU processing) to determine an intent to cease output of the content. The content injection component 285 may thereafter determine injected content should not be output based at least in part on the intent to cease output of the original content.

The device 110 may alternatively receive a natural language input to decrease output of injected content while content, responsive to a natural language input, is being output. For example, while plane ticket booking information is being output, a user may say "Alexa, only output injected content 3 times a week." The remote system 120 may process the input data to determine an intent to decrease or otherwise alter a frequency at which injected content should be output. The content injection component 285 may therefrom determine a frequency at which injected content was output prior to receiving the current natural language input. If the frequency at which injected content was output is equal to or greater than the decreased or otherwise altered frequency, the content injection component 285 may determine not to output injected content. If the frequency at which injected content was output is less than the decreased or otherwise altered frequency, the content injection component 285 may determine to output injected content using the teachings disclosed herein.

It will be appreciated that, with respect to any single natural language input, the content injection skill system 125*a* may send a request 355 to more than one content provider(s) 130. The content injection skill system 125*a* may send all injected content, received from the one or more queried content providers 130, to the content injection component 285. Each portion of injected content, sent to the content injection component 285, may be associated with a content provider identifier corresponding to the content provider 130 that provided the portion of injected content.

After receiving the injected content 365, the content injection component 285 may cause the device 110 to output the injected content 365. For example, the content injection component 285 may send the injected content 365 to the orchestrator component 230, which may send the injected content 365 to the device 110 for output.

In at least some examples, the injected content is to be output as audio, and the injected content sent from the content injection component 285 to the orchestrator component 230 is text. In such examples, the orchestrator component 230 may send the text to the TTS component 280. The TTS component 280 may perform TTS processing on the text to generate synthesized speech corresponding to the unresponsive text. The TTS component 280 may send the synthesized speech to the orchestrator component 230, which may thereafter send the synthesized speech to the device 110 for output.

As used herein, a "dialog" may refer to data transmissions (such as relating to multiple user inputs and remote system 120 outputs) between the remote system 120 and a device(s) 110 that all relate to a single originating user input. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier.

Figure 4:
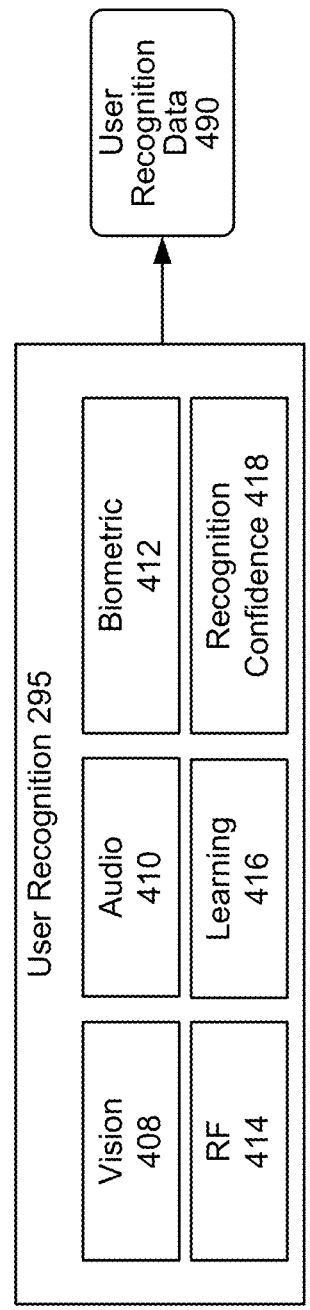
FIG. 4 is a schematic diagram of an illustrative architecture in which sensor data is combined to recognize one or more users.

FIG. 4 is a schematic diagram of an illustrative architecture in which sensor data is combined to recognize one or more users, in accordance with embodiments of the present disclosure. As described above, the remote system 120 may include a user recognition component 295. The user recognition component 295 may recognize one or more users using a variety of data.

As illustrated in FIG. 4, the user recognition component 295 may include one or more subcomponents including a vision component 408, an audio component 410, a biometric component 412, a radio frequency (RF) component 414, a learning component 416, and a recognition confidence component 418. In some instances, the user recognition component 295 may monitor data and determinations from one or more subcomponents to recognize an identity of one or more users associated with data input to the remote system 120. The user recognition component 295 may output user recognition data 490, which may include a user identifier associated with a user the user recognition component 295 believes originated data input to the remote system 120. The user recognition component 295 may be used to inform processes performed by various components of the remote system 120 as described herein.

The vision component 408 may receive data from one or more sensors capable of providing images (e.g., cameras) or sensors indicating motion (e.g., motion sensors). The vision component 408 can perform facial recognition or image analysis to determine an identity of a user and to associate that identity with a user profile associated with the user. In some instances, when a user is facing a camera, the vision component 408 may perform facial recognition and identify the user with a high degree of confidence. In other instances, the vision component 408 may have a low degree of confidence of an identity of a user, and the user recognition component 295 may use determinations from additional components to determine an identity of a user. The vision component 408 can be used in conjunction with other components to determine an identity of a user. For example, the user recognition component 295 may use data from the vision component 408 with data from the audio component 410 to identify what user's face appears to be speaking at the same time audio is captured by a device 110 the user is facing for purposes of identifying a user who spoke an input to the remote system 120.

The overall system of the present disclosure may include biometric sensors that transmit data to the biometric component 412. For example, the biometric component 412 may receive data corresponding to fingerprints, iris or retina scans, thermal scans, weights of users, a size of a user, pressure (e.g., within floor sensors), etc., and may determine a biometric profile corresponding to a user. The biometric component 412 may distinguish between a user and sound from a television, for example. Thus, the biometric component 412 may incorporate biometric information into a confidence level for determining an identity of a user. Biometric information output by the biometric component 412 can be associated with specific user profile data such that the biometric information uniquely identifies a user profile of a user.

The RF component 414 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 414 the strength of the signal (e.g., as a received signal strength indication (RSSI)). The RF component 414 may use the RSSI to determine an identity of a user (with an associated confidence level). In some instances, the RF component 414 may determine that a received RF signal is associated with a mobile device that is associated with a particular user identifier.

In some instances, a device 110 may include some RF or other detection processing capabilities so that a user who speaks an input may scan, tap, or otherwise acknowledge the user's personal device (such as a phone) to the device 110. In this manner, the user may "register" with the remote system 120 for purposes of the remote system 120 determining who spoke a particular input. Such a registration may occur prior to, during, or after speaking of an input.

The learning component 416 may track the behavior of various users as a factor in determining a confidence level of the identity of the user. By way of example, a user may adhere to a regular schedule such that the user is at a first location during the day (e.g., at work or at school). In this example, the learning component 416 would factor in past behavior and/or trends in determining the identity of the user that provided input to the remote system 120. Thus, the learning component 416 may use historical data and/or usage patterns over time to increase or decrease a confidence level of an identity of a user.

In at least some instances, the recognition confidence component 418 receives determinations from the various components 408, 410, 412, 414, and 416, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 295.

The audio component 410 may receive data from one or more sensors capable of providing an audio signal (e.g., one or more microphones) to facilitate recognition of a user. The audio component 410 may perform audio recognition on an audio signal to determine an identity of the user and associated user identifier. In some instances, aspects of the remote system 120 may be configured at a computing device (e.g., a local server). Thus, in some instances, the audio component 410 operating on a computing device may analyze all sound to facilitate recognition of a user. In some instances, the audio component 410 may perform voice recognition (e.g., voice recognition processing) to determine an identity of a user.

The audio component 410 may also perform user identification based on audio data 211 input into the remote system 120 for speech processing. The audio component 410 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 410 may perform user recognition by comparing speech characteristics represented in the audio data 211 to stored speech characteristics of users (e.g., stored voice profiles associated with the device 110 that captured the spoken user input).

Figure 5:
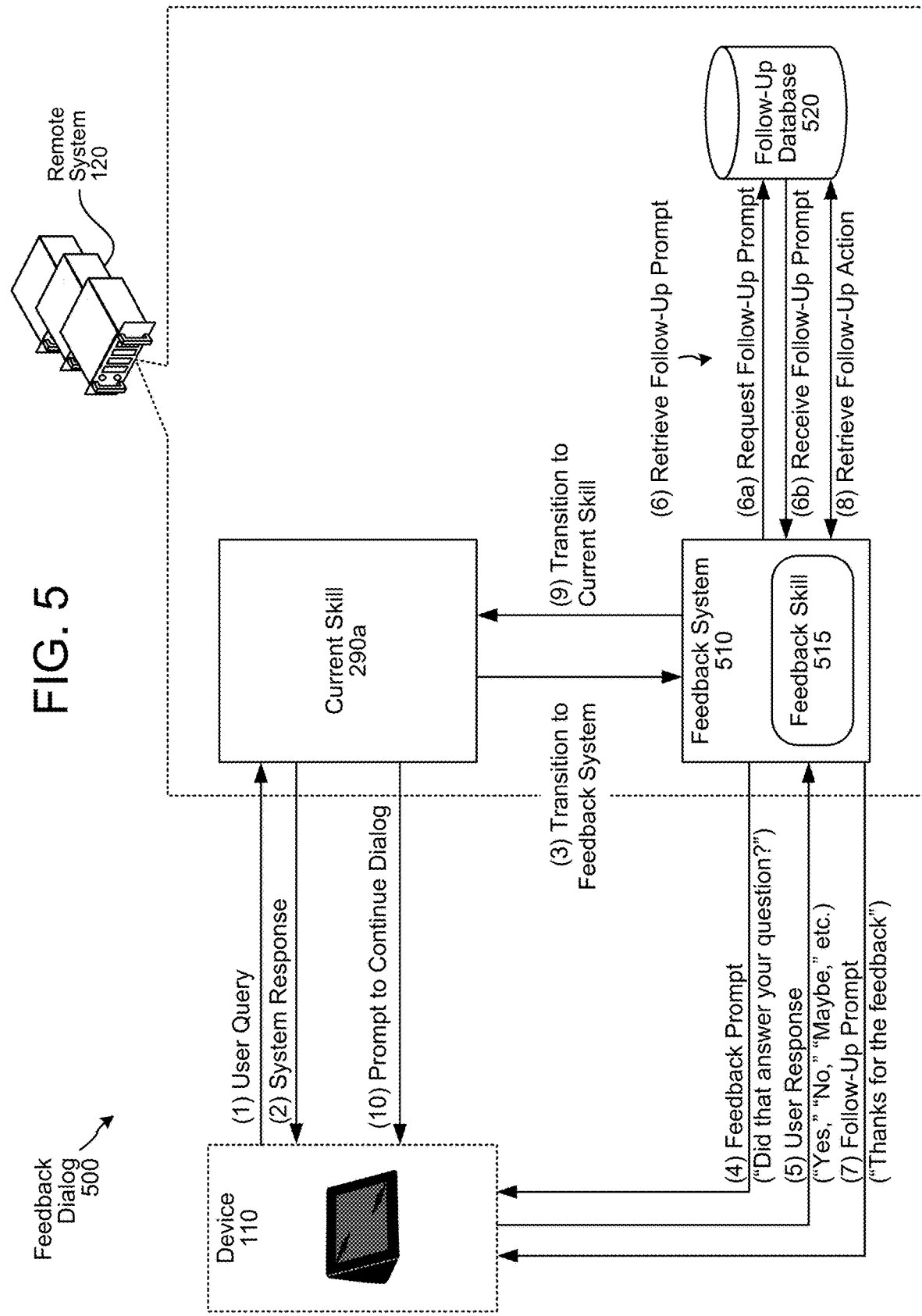
FIG. 5 is a conceptual diagram illustrating an example of requesting feedback and performing a follow-up action.

FIG. 5 is a conceptual diagram illustrating an example of requesting feedback (e.g., feedback data representing feedback) and performing a follow-up action. As illustrated in FIG. 5, a device 110 may interact with a remote system 120 as part of a dialog and then request feedback. As discussed above, a dialog may be an exchange or interaction between the device 110 and the remote system 120, where the user speaks a voice command and the remote system 120 performs one or more actions responsive to the voice command. As illustrated in FIG. 5, for example, the device 110 may send first data representing a user query to the remote system 120 (step "1"). In some examples, the first data may correspond to audio data representing an utterance, although the disclosure is not limited thereto and the first data may correspond to text data, image data, and/or the like without departing from the disclosure.

In response to receiving the first data, the remote system 120 may process the first data, determine that the first data corresponds to a particular skill 290*a* (e.g., current skill 290*a*), process the first data using the current skill 290*a*, and then send second data representing a system response to the device 110 (step "2"). In some examples, the second data may correspond to audio data representing synthesized speech, although the disclosure is not limited thereto and the second data may correspond to text data, image data, and/or the like without departing from the disclosure.

After sending the system response to the device 110 using the current skill 290*a*, the remote system 120 may request feedback from the device 110 using a feedback system 510. The feedback system 510 may correspond to a feedback skill 515 that is separate from the current skill 290*a*. Thus, the current skill 290*a* passes off the interaction to the feedback skill 515 to request the feedback from the device 110.

As illustrated in FIG. 5, the current skill 290*a* may transition to the feedback system 510 (step "3") and the feedback system 510 may send third data representing a feedback prompt (e.g., "Did that answer your question") to the device 110 (step "4"). In some examples, the third data may correspond to audio data representing synthesized speech, although the disclosure is not limited thereto and the third data may correspond to text data, image data, and/or the like without departing from the disclosure.

The feedback system 510 may receive fourth data representing a user response (e.g., "Yes," "No," "Maybe," etc.) from the device 110 (step "5") and may process the fourth data to determine the user response (e.g., generate feedback data representing the user response). In some examples, the fourth data may correspond to audio data representing an utterance, although the disclosure is not limited thereto and the fourth data may correspond to text data, image data, and/or the like without departing from the disclosure. The remote system 120 may use the user response to improve future interactions with the device 110 and/or measure a performance of the current skill 290*a*, although the disclosure is not limited thereto.

The feedback system 510 may then retrieve a follow-up prompt from a follow-up database 520 (step "6"). As illustrated in FIG. 5, retrieving the follow-up prompt may correspond to two separate steps; the feedback system 510 may request a follow-up prompt from the follow-up database 520 (step "6a") and may receive fifth data representing the follow-up prompt from the follow-up database 520 (step "6b"). For ease of illustration, later drawings may illustrate these two steps as a single step of retrieving data, although the disclosure is not limited thereto. In some examples, the fifth data may correspond to text data, although the disclosure is not limited thereto and the fifth data may correspond to text data, image data, audio data representing synthesized speech, and/or the like without departing from the disclosure.

While FIG. 5 illustrates the follow-up database 520 as a database that is separate from the feedback system 510, the disclosure is not limited thereto. In some examples the follow-up database 520 may be a local database that is associated with the feedback system 510, a lookup table associated with the feedback system 510, and/or the like without departing from the disclosure.

The feedback system 510 may then send the follow-up prompt (e.g., "Thanks for the feedback") to the device 110 (step "7"). For example, if the fifth data corresponds to text data, the feedback system 510 may perform text-to-speech (TTS) processing on the fifth data to generate sixth data corresponding to audio data representing synthesized speech and may send the sixth data to the device 110. Alternatively, if the fifth data corresponds to audio data representing synthesized speech, the feedback system 510 may send the fifth data directly to the device 110 without further processing.

After sending the follow-up prompt to the device 110, the feedback system 510 may perform a follow-up action, such as transitioning back to the current skill 290a. As illustrated in FIG. 5, the feedback system 510 may retrieve seventh data representing a follow-up action from the follow-up database 520 (step "8") and may transition to the current skill 290a (step "9"). For example, the feedback system 510 may retrieve a follow-up action to perform, which may include an identifier of the current skill 290a, an address associated with the current skill 290a, a command to perform a secondary action (e.g., request consent), and/or the like. In some examples, the feedback system 510 may send eighth data (e.g., message) to the current skill 290a as part of the transition, although the disclosure is not limited thereto. For example, the feedback system 510 may pass the interaction back to the current skill 290a by sending a message that instructs the current skill 290a to perform a secondary action (e.g., request consent from the device 110 to use the interaction as training data to train a model), although the disclosure is not limited thereto.

In some examples, the follow-up action may depend on the current skill 290a, such that a first skill may correspond to a first follow-up action while a second skill may correspond to a second follow-up action without departing from the disclosure. For example, the first follow-up action associated with the first skill may correspond to ending the dialog, whereas the second follow-up action associated with the second skill may correspond to transitioning to the second skill and continuing the dialog. In some examples, the second follow-up action associated with the second skill may correspond to transitioning to the second skill and performing a secondary action, such as requesting consent/ permission to perform additional processing and/or the like. For example, the second follow-up action may result in the feedback system 510 sending a message to the second skill that includes a message payload, and, based on the message payload, the second skill may perform the secondary action, although the disclosure is not limited thereto.

Additionally or alternatively, the follow-up action may depend on the user response received in step 5. For example, an affirmative response (e.g., "Yes") may correspond to a first follow-up action while a negative response (e.g., "No," "Maybe," etc.) may correspond to a second follow-up action. In some examples, the affirmative response may result in a first follow-up action in which the dialog ends, whereas the negative response may result in a second follow-up action in which the feedback system 510 transitions to the current skill 290a and the current skill 290a continues the dialog. However, the disclosure is not limited thereto, and in other examples both the first follow-up action and the second follow-up action result in the feedback system 510 transitioning to the current skill 290a and the current skill 290a performing a secondary action. For example, the affirmative response may result in the current skill 290a continuing the dialog, whereas the negative response may result in the current skill 290a requesting consent/permission to perform additional processing and/or the like, although the disclosure is not limited thereto.

The follow-up database 520 may store one or more follow-up prompts and one or more follow-up actions for an individual skill. In some examples, the follow-up database 520 may store a single follow-up prompt associated with the current skill 290a, such that the feedback system 510 sends the same follow-up prompt in response to any user response (e.g., "Yes," No," "Maybe," etc.). However, the disclosure is not limited thereto and in other examples the follow-up database 520 may store two or more follow-up prompts associated with the current skill 290a, such that the feedback system 510 may send a unique follow-up prompt in response to different user responses without departing from the disclosure. Additionally or alternatively, the follow-up database 520 may store unique follow-up prompt(s) associated with each of a plurality of skills, although the disclosure is not limited thereto and multiple skills may be associated with the same follow-up prompt(s) without departing from the disclosure.

In some examples, the follow-up database 520 may store a single follow-up action associated with the current skill 290a, such that the feedback system 510 sends the same follow-up action in response to any user response (e.g., "Yes," No," "Maybe," etc.). However, the disclosure is not limited thereto and in other examples the follow-up database 520 may store two or more follow-up actions associated with the current skill 290a, such that the feedback system 510 may send a unique follow-up action in response to different user responses without departing from the disclosure.

As discussed above, the feedback system 510 may transition back to the current skill 290a (step "9") to continue the dialog. Thus, after requesting feedback, the feedback system 510 may pass the dialog back to the current skill 290a that originated the dialog. In some examples, the feedback system 510 may send eighth data representing a message to the current skill 290a as part of the transition, although the disclosure is not limited thereto. The current skill 290a may then send ninth data representing a prompt to continue dialog to the device 110 (step "10"), although the disclosure is not limited thereto. In some examples, the ninth data may correspond to audio data representing synthesized speech, although the disclosure is not limited thereto and the ninth data may correspond to text data, image data, and/or the like without departing from the disclosure.

In order to transition back to the current skill 290a, the feedback system 510 may need to store information about the current skill 290a prior to requesting the feedback from the user. For example, the feedback system 510 may receive the dialog from the current skill 290a and then store information about the current skill 290a, such as an identifier of the current skill, an address associated with the current skill, and/or other data. The feedback system 510 may store the data locally or in the follow-up database 520 without departing from the disclosure.

As illustrated in FIG. 5, the feedback dialog 500 passes an interaction from a current skill 290*a* to the feedback system 510 to request feedback from the device 110, then passes the interaction back to the current skill 290*a* to continue the dialog. If the dialog corresponds to public knowledge or unprivileged data, the remote system 120 may use the feedback received from the device 110 to improve future interactions, track a performance of the current skill 290*a* and/or the remote system, train a model, and/or the like. For example, if the original user query was associated with public knowledge that is not particular to the user of the device 110, the remote system 120 may generate training data based on the feedback. Thus, if the user responded "Yes" to the feedback prompt (e.g., "Did that answer your question"), the remote system 120 may generate positive training data indicating that a correct response was provided to the device 110. In contrast, if the user responded "No" to the feedback prompt (e.g., "Did that answer your question"), the remote system 120 may generate negative training data indicating that an incorrect response was provided to the device 110.

In some examples, however, the dialog may correspond to private data or privileged data that is specific to the user or in some other way sensitive information. To improve privacy protection for the user, the remote system 120 may not automatically use this private data to generate training data, but may instead request consent from the user prior to generating the training data. If the user provides consent, the remote system 120 may generate training data associated with the dialog, including information associated with the consent being given, to enable further improvements of the remote system 120.

Figure 6:
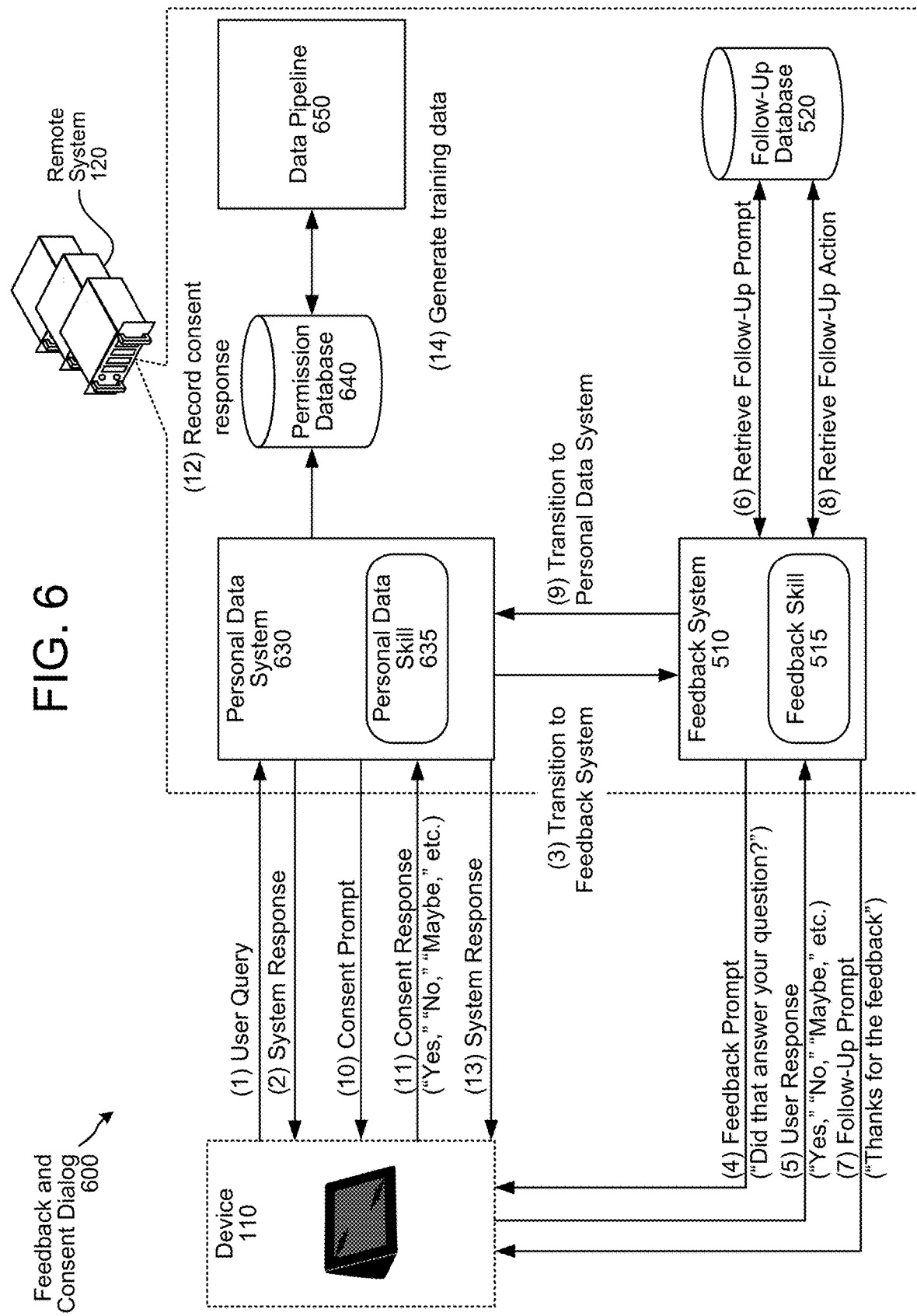
FIG. 6 is a conceptual diagram illustrating an example of requesting feedback and consent.

FIG. 6 is a conceptual diagram illustrating an example of requesting feedback and consent. As illustrated in FIG. 6, the remote system 120 may interact with the device 110 as part of a dialog, and then request feedback, as described above with regard to feedback dialog 500. Whereas FIG. 5 illustrates the device 110 interacting with a generic skill (e.g., current skill 290*a*), FIG. 6 illustrates an example in which the device 110 interacts with a personal data system 630 that is associated with a personal data skill 635. For example, the personal data system 630 may be configured to search personal data such as reminder data, calendar data, personal lists, and/or other sources of personal data without departing from the disclosure. While the personal data system 630/personal data skill 635 may correspond to the current skill 290*a* without departing from the disclosure, FIG. 6 includes the personal data system 630 to specifically illustrate an example in which private data is involved. For example, the personal data system 630 may be associated with private data and the remote system 120 may implement additional privacy protection to protect the private data.

Examples of private data may include contacts, calendar entries, messages (e.g., text(s), email(s), etc.), information specific to the user (e.g., personal information, user preferences, etc.), information specific to family members of the user, information associated with a user profile, and/or the like. While a level of sensitivity or privacy associated with information included in the private data may vary, the remote system 120 may not distinguish between the private data and may request consent before using any of the private data for training purposes.

FIG. 6 illustrates an example of the remote system 120 requesting consent prior to using the dialog data for training purposes. For example, the feedback and consent dialog 600 illustrates an example of an initial dialog (steps "1" and "2") and requesting feedback (steps "3"-"7"), which were illustrated in steps 1-7 of FIG. 5 and described in greater detail above.

After retrieving the follow-up prompt (step "6") and sending the follow-up prompt to the device 110 (step "7"), however, FIG. 6 illustrates that the feedback system 510 may retrieve a follow-up action from the follow-up database 520 (step "8"). For example, the feedback system 510 may retrieve seventh data representing a follow-up action that includes an identifier of the personal data system 630 and/or the personal data skill 635, an address associated with the personal data system 630, a command to perform a secondary action (e.g., request consent), and/or the like.

In some examples, the follow-up action may depend on an identity of the personal data system 630, such that a first personal data system 630*a* (e.g., first skill) may correspond to a first follow-up action while a second personal data system 630*b* (e.g., second skill) may correspond to a second follow-up action without departing from the disclosure. For example, the first follow-up action associated with the first skill may correspond to ending the dialog, whereas the second follow-up action associated with the second skill may correspond to transitioning to the second skill and continuing the dialog. In some examples, the second follow-up action associated with the second skill may correspond to transitioning to the second skill and performing a secondary action, such as requesting consent to perform additional processing and/or the like. For example, the second follow-up action may result in the feedback system 510 sending a message to the second skill that includes a message payload, and, based on the message payload, the second skill may perform the secondary action, although the disclosure is not limited thereto.

Additionally or alternatively, the follow-up action may depend on the user response received in step 5. For example, an affirmative response (e.g., "Yes") may correspond to a first follow-up action while a negative response (e.g., "No," "Maybe," etc.) may correspond to a second follow-up action, as described in greater detail below. In some examples, the affirmative response may result in a first follow-up action in which the dialog ends, whereas the negative response may result in a second follow-up action in which the feedback system 510 transitions to the current skill 290*a* and the current skill 290*a* continues the dialog. However, the disclosure is not limited thereto, and in other examples both the first follow-up action and the second follow-up action result in the feedback system 510 transitioning to the current skill 290*a* and the current skill 290*a* performing a secondary action. For example, the affirmative response may result in the current skill 290*a* continuing the dialog, whereas the negative response may result in the current skill 290*a* requesting consent to perform additional processing and/or the like, although the disclosure is not limited thereto.

The follow-up database 520 may store one or more follow-up prompts and one or more follow-up actions for the personal data system 630. In some examples, the follow-up database 520 may store a single follow-up prompt associated with the personal data system 630, such that the feedback system 510 sends the same follow-up prompt in response to any user response (e.g., "Yes," No," "Maybe," etc.). However, the disclosure is not limited thereto and in other examples the follow-up database 520 may store two or more follow-up prompts associated with the personal data system 630, such that the feedback system 510 may send a unique follow-up prompt in response to different user responses without departing from the disclosure. Additionally or alternatively, the follow-up database 520 may store unique follow-up prompt(s) associated with each skill of a plurality of skills, although the disclosure is not limited thereto and multiple skills may be associated with the same follow-up prompt(s) without departing from the disclosure.

In some examples, the follow-up database 520 may store a single follow-up action associated with the personal data system 630, such that the feedback system 510 sends the same follow-up action in response to any user response (e.g., "Yes," No," "Maybe," etc.). However, the disclosure is not limited thereto and in other examples the follow-up database 520 may store two or more follow-up actions associated with the personal data system 630, such that the feedback system 510 may send a unique follow-up action in response to different user responses without departing from the disclosure.

After retrieving the follow-up action from the follow-up database 520, the feedback system 510 may perform the follow-up action by transitioning to the personal data system 630 (step "9"). In some examples, the feedback system 510 may send eighth data (e.g., message) to the personal data system 630 as part of the transition, although the disclosure is not limited thereto. For example, the feedback system 510 may pass the interaction back to the personal data system 630 by sending a message that causes the personal data system 630 to perform a secondary action. For example, the secondary action may correspond to requesting consent from the device 110 to use the interaction as training data to train a model and/or perform additional processing, although the disclosure is not limited thereto.

The personal data system 630 may send ninth data representing a consent prompt (e.g., "Want to help us improve?") to the device 110 (step "10"). In some examples, the ninth data may correspond to audio data representing synthesized speech, although the disclosure is not limited thereto and the ninth data may correspond to text data, image data, and/or the like without departing from the disclosure. The device 110 may generate output audio using the audio data and/or generate a display using the text data and/or image data.

In response to the consent prompt, the personal data system 630 may receive tenth data representing a consent response (e.g., "Yes," "No," Maybe," etc.) from the device 110 (step "11"). The personal data system 630 may process the tenth data to determine the consent response. In some examples, the tenth data may correspond to audio data representing an utterance, although the disclosure is not limited thereto and the tenth data may correspond to text data, image data, and/or the like without departing from the disclosure. For example, if the tenth data corresponds to audio data, the personal data system 630 may perform speech processing to determine the consent response.

Based on the consent response, the remote system 120 may record the consent response in a permission database 640 (step "12"). For example, if the consent response is affirmative (e.g., "Yes" or similar), the remote system 120 may store eleventh data (e.g., utterance data) corresponding to the consent response and/or the dialog in the permission database 640. In some examples, the eleventh data may include the exact response (e.g., audio data representing the consent response, text data representing the consent response, and/or the like), identifier(s) for the utterance(s), an identifier for the user (e.g., customer ID), time information (e.g., timestamp) associated with the consent response, a type of consent response (e.g., "Yes, "No," etc.), and/or the like.

In some examples, the remote system 120 may not store any entry in the permission database 640 when the consent response is negative (e.g., "No") or unclear (e.g., "Maybe"). However, the disclosure is not limited thereto, and in other examples the remote system 120 may store an entry indicating that the consent response was negative. For example, the remote system 120 may not store identifier(s) for the utterance(s), but may include an identifier for the user (e.g., customer ID), time information associated with the consent response, an indication that the consent response was negative (e.g., "No"), and/or the like. Thus, the remote system 120 may keep track of how often the remote system 120 requests permission to perform additional processing, how often the user grants permission to perform additional processing, how often the user denies permission to perform additional processing, and/or the like. For example, the remote system 120 may limit the number of times that the remote system 120 requests permission to perform additional processing. Additionally or alternatively, the remote system 120 may stop requesting permission to perform additional processing after the permission is denied a number of times in a row or the like.

While FIG. 6 illustrates the permission database 640 as a database, the disclosure is not limited thereto and the permission database 640 may correspond to any storage device known to one of skill in the art. For example, the permission database 640 may be a lookup table stored in memory, a data storage component, and/or the like without departing from the disclosure.

The personal data system 630 may then send twelfth data representing a system response to the device 110 (step "13"), although the disclosure is not limited thereto. In some examples, the twelfth data may correspond to audio data representing synthesized speech, although the disclosure is not limited thereto and the twelfth data may correspond to text data, image data, and/or the like without departing from the disclosure. In some examples, the system response may depend on the consent response, although the disclosure is not limited thereto. The system response may indicate acknowledgement and/or appreciation of the consent response, may correspond to a prompt to end dialog, may correspond to a prompt to continue dialog, and/or the like without departing from the disclosure.

Periodically, the remote system 120 may use a data pipeline 650 to pull the utterance data from the permission database 640 and generate training data (step "14"). The remote system 120 may then train a model and/or use the training data to improve using any technique known to one of skill in the art without departing from the disclosure.

FIG. 7 is a conceptual diagram illustrating an example of requesting feedback and consent. While FIG. 7 is similar to the example illustrated in FIG. 6, the feedback and consent dialog 700 illustrated in FIG. 7 is a more general example that is focused on how the feedback skill 515 retrieves a destination address (e.g., link) indicating the current skill 290*a* and transitions back to the current skill 290*a*.

As illustrated in FIG. 7, the device 110 and the current skill 290*a* may interact as part of an interaction dialog (step "1"). For example, the interaction dialog may include the device 110 sending input data (e.g., user query, utterance, and/or the like) to the current skill 290*a* and the current skill 290*a* sending a system response to the device 110 that is responsive to the input data. In some examples, the interaction dialog may correspond to multiple iterations of the device 110 sending input data and the current skill 290*a* sending a system response, although the disclosure is not limited thereto.

At the conclusion of the interaction dialog, after the remote system 120 determines that the original input has been processed and that an appropriate action has been performed, the remote system 120 may request feedback from the device 110. To request this feedback, the remote system 120 may shift the interaction from the current skill 290*a* to the feedback skill 515. For example, the current skill 290*a* may transition to the feedback skill 515 by sending a message including a source field in a message payload (step "2"), although the disclosure is not limited thereto. The feedback skill 515 may identify the source (e.g., an identifier associated with the current skill 290*a*) in the message payload and store an indication that the feedback is associated with the source. For example, the feedback skill 515 may store the identifier associated with the current skill 290*a*, a name of the current skill 290*a*, an address associated with the current skill 290*a*, and/or the like without departing from the disclosure.

The feedback skill 515 may send first data representing a feedback prompt (e.g., "Did that answer your question") to the device 110 (step "3"). In some examples, the first data may correspond to audio data representing synthesized speech, although the disclosure is not limited thereto and the first data may correspond to text data, image data, and/or the like without departing from the disclosure.

The feedback skill 515 may receive second data representing a user response (e.g., "Yes," "No," "Maybe," etc.) from the device 110 (step "4") and may process the second data to determine the user response. In some examples, the second data may correspond to audio data representing an utterance, although the disclosure is not limited thereto and the second data may correspond to text data, image data, and/or the like without departing from the disclosure. The remote system 120 may use the user response to improve future interactions with the device 110 and/or measure a performance of the current skill 290*a*, although the disclosure is not limited thereto.

The feedback skill 515 may then retrieve a follow-up prompt from the follow-up database 520 (step "5"). While illustrated as a single step in FIG. 7, retrieving the follow-up prompt may correspond to two separate steps; the feedback skill 515 may request a follow-up prompt from the follow-up database 520 and may receive third data representing the follow-up prompt from the follow-up database 520. In some examples, the third data may correspond to text data, although the disclosure is not limited thereto and the third data may correspond to text data, image data, audio data representing synthesized speech, and/or the like without departing from the disclosure.

As discussed in greater detail below, the follow-up prompt may depend on the source (e.g., current skill 290*a*), the user response (e.g., "Yes," "No, "Maybe," etc.), and/or other information. For example, the follow-up database 520 may store a first follow-up prompt for a first source (e.g., first skill) and may store a second follow-up prompt for a second source (e.g., second skill) without departing from the disclosure. Additionally or alternatively, the follow-up database 520 may store a first follow-up prompt for a first user response (e.g., "Yes") and a second follow-up prompt for a second user response (e.g., "No") without departing from the disclosure.

The feedback skill 515 may send the follow-up prompt (e.g., "Thanks for the feedback") to the device 110 (step "6"). If the feedback skill 515 receives the follow-up prompt as text data, the feedback skill 515 may perform text-to-speech (TTS) processing on the text data to generate audio data representing synthesized speech and send the audio data to the device 110, although the disclosure is not limited thereto.

After sending the follow-up prompt to the device 110, the feedback skill 515 may retrieve a follow-up action from the follow-up database 520 (step "7"). For example, the feedback skill 515 may retrieve a follow-up action that includes an identifier of the current skill 290*a*, an address associated with the current skill 290*a*, a command to request consent, and/or the like.

In some examples, the follow-up action may depend on the source (e.g., current skill 290*a*), such that a first skill may be associated with a first follow-up action while a second skill may be associated with a second follow-up action without departing from the disclosure. Additionally or alternatively, the follow-up action may depend on the user response received in step 4. For example, an affirmative response (e.g., "Yes") may be associated with a first follow-up action while a negative response (e.g., "No," "Maybe," etc.) may be associated with a second follow-up action, as described in greater detail below.

After retrieving the follow-up action from the follow-up database 520, the feedback skill 515 may transition to the current skill 290*a* (step "8"). For example, the follow-up action may instruct the feedback skill 515 to transition to the current skill 290*a* by sending a message to the current skill 290*a* that includes a message payload, although the disclosure is not limited thereto. Thus, the feedback skill 515 may pass the interaction back to the current skill 290*a* and the current skill 290*a* may perform a secondary action. For example, the secondary action may correspond to requesting consent from the device 110 to use the interaction as training data.

In some examples, the secondary action to perform is indicated by the message payload sent to the current skill 290*a*. Thus, the current skill 290*a* may receive the interaction and determine the secondary action to perform based on the message payload. For example, if the message payload corresponds to an affirmative response (e.g., "Yes") then the current skill 290*a* may perform a first secondary action (e.g., request consent), whereas if the message payload corresponds to a negative response (e.g., "No") then the current skill 290*a* may perform a second secondary action (e.g., continue dialog without requesting consent). However, the disclosure is not limited thereto and the message payload may vary without departing from the disclosure. For example, the message payload may explicitly include a command to perform the secondary action without departing from the disclosure. Additionally or alternatively, the current skill 290*a* may perform a single secondary action regardless of the contents of the message payload. For example, the current skill 290*a* may perform the secondary action (e.g., request consent) any time that the feedback skill 515 transitions the interaction back to the current skill 290*a*, although the disclosure is not limited thereto.

The current skill 290*a* may determine a secondary action to perform, generate a secondary response corresponding to the secondary action, and send fourth data representing the secondary response to the device 110 (step "9"). In some examples, the current skill 290*a* may send fourth data representing a consent prompt (e.g., "Can we use this interaction to improve?") to the device 110, as described in greater detail above. However, the disclosure is not limited thereto and in other examples, the current skill 290*a* may generate a secondary response corresponding to any secondary action known to one of skill in the art without departing from the disclosure.

To illustrate an example, if the feedback response indicates that the previous system response was not responsive to the original question and/or did not answer the question, the current skill 290a may provide a second system response to attempt to correctly answer the question. For example, the current skill 290a may generate the first system response based on a first intent, and, in response to the feedback response indicating that the first response was not accurate, may generate the second system response based on a second intent. Additionally or alternatively, the current skill 290a may process the original user query a second time to generate the second system response, although the disclosure is not limited thereto.

To illustrate another example, the current skill 290a may generate a second system response related to the original user query, without trying to answer the original user query. For example, if the original user query corresponds to a request for information about an upcoming concert for a particular artist, the second system response may correspond to other information associated with the particular artist, such as current news, album information, merchandise for sale, and/or the like. Thus, the current skill 290a may generate a second system response that continues the dialog or performs a secondary action other than requesting permission to generate training data without departing from the disclosure.

In some examples, the fourth data may correspond to audio data representing synthesized speech, although the disclosure is not limited thereto and the fourth data may correspond to text data, image data, and/or the like without departing from the disclosure. The device 110 may generate output audio using the audio data and/or generate a display using the text data and/or image data.

While not illustrated in FIG. 7, the current skill 290a may receive a consent response and record confirmation of consent as described above with regard to FIG. 6. For example, the current skill 290a may receive fifth data representing a consent response (e.g., "Yes," "No," Maybe," etc.) from the device 110 and may process the fifth data to determine the consent response. In some examples, the fifth data may correspond to audio data representing an utterance, although the disclosure is not limited thereto and the fifth data may correspond to text data, image data, and/or the like without departing from the disclosure. For example, if the fifth data corresponds to audio data, the current skill 290a may perform speech processing to determine the consent response.

Based on the consent response, the remote system 120 may record confirmation by storing utterance data. For example, if the consent response is affirmative (e.g., "Yes" or similar), the remote system 120 may store sixth data (e.g., utterance data) corresponding to the consent response and/or the dialog in the permission database 640. In some examples, the sixth data may include the exact response (e.g., audio data representing the consent response, text data representing the consent response, and/or the like) along with additional information such as an identifier for the utterance, an identifier for the user, and/or the like.

When the consent response is negative (e.g., "No") or unclear (e.g., "Maybe"), the remote system 120 may not store any entry in the permission database 640. However, the disclosure is not limited thereto, and in some examples the remote system 120 may store an entry indicating that the consent response was negative, along with additional information such as a timestamp, an identifier for the utterance, an identifier for the user, and/or the like. The remote system 120 may use this information to determine whether to request consent in the future. For example, the remote system 120 may limit a number of times that the remote system 120 requests consent (e.g., after receiving a first number of negative responses, the remote system 120 stops asking for consent), may limit a frequency that the remote system 120 requests consent (e.g., only requests consent a second number of times for a duration of time), and/or the like.

As described above, the follow-up database 520 may store one or more follow-up prompts without departing from the disclosure. Additionally or alternatively, the follow-up database 520 may store one or more follow-up actions for the current skill 290a. In some examples, the follow-up database 520 may store a single follow-up action associated with the current skill 290a, such that the feedback skill 515 retrieves the same follow-up action in response to any user response (e.g., "Yes," No," "Maybe," etc.). However, the disclosure is not limited thereto and in other examples the follow-up database 520 may store two or more follow-up actions associated with the current skill 290a, such that the feedback skill 515 may retrieve a unique follow-up action in response to different user responses without departing from the disclosure. Additionally or alternatively, the follow-up database 520 may store unique follow-up action(s) associated with each skill of a plurality of skills, although the disclosure is not limited thereto and multiple skills may be associated with the same follow-up action(s) without departing from the disclosure.

FIG. 8 illustrates examples of a follow-up prompt table and a follow-up action table stored in the follow-up database 520. As illustrated in FIG. 8, the follow-up database 520 may store a follow-up prompt table 810 that includes a first column indicating a source identification (e.g., <SourceID>, such as "Source1," "Source2," etc.) and a second column indicating a custom feedback prompt (e.g., <Prompt>, such as <Prompt1>, <Prompt2>, etc.). For example, the remote system 120 may generate a unique customer feedback prompt for an individual skill 290, such as a first feedback prompt (e.g., <Prompt1>) for a first skill (e.g., Source1) and a second feedback prompt (e.g., <Prompt2>) for a second skill (e.g., Source2). However, the disclosure is not limited thereto, and the follow-up prompt table 810 may include the same feedback prompt for multiple skills without departing from the disclosure.

As illustrated in FIG. 8, the follow-up database 520 may also store a follow-up action table 820 that includes a first column indicating a source identification (e.g., <SourceID>, such as "Source1," "Source2," etc.) along with three additional columns indicating three different potential follow-up actions. In the example illustrated in FIG. 8, the three different potential follow-up actions correspond to an Affirmative (e.g., "Yes") user response (e.g., Feedback[Yes]), a Negative (e.g., "No") user response (e.g., Feedback[No]), and an unclear (e.g., "Maybe") user response (e.g., Feedback [Maybe]).

To illustrate a first example, if the current skill 290a corresponds to Source1, the follow-up database 520 may include a single follow-up action to perform regardless of the user response. This is illustrated in FIG. 8 by the three columns of follow-up actions corresponding to Source1 all including a first action (e.g., <Action1>). For example, the first action may transition to the current skill 290a (e.g., Source1), regardless of whether the user response is affirmative, negative, or unclear.

To illustrate a second example, if the current skill 290a corresponds to Source2, the follow-up database 520 may include two separate follow-up actions to perform depending on the user response. This is illustrated in FIG. 8 by the first follow-up action column (e.g., Feedback[Yes]) corresponding to Source2 including a second action (e.g., <Action2>) while the second follow-up action column (e.g., Feedback[No]) and the third follow-up action column (e.g., Feedback[Maybe]) corresponding to Source2 including a third action (e.g., <Action3>). Thus, the remote system 120 may perform a first follow-up action when the user response is affirmative and may perform a second follow-up action when the user response is negative or unclear.

In some examples, the first follow-up action may correspond to transitioning to the current skill 290a, while the second follow-up action may correspond to ending the interaction. However, the disclosure is not limited thereto, and in other examples the first follow-up action may correspond to transitioning to the current skill 290a and requesting consent (e.g., sending a consent prompt) to store utterance data as training data, while the second follow-up action may correspond to transitioning to the current skill 290a and continuing the dialog without requesting consent. Thus, while both the first follow-up action and the second follow-up action correspond to transitioning to the current skill 290a, the first follow-up action results in the current skill 290a performing a first secondary action, while the second follow-up action results in the current skill 290a performing a second secondary action, as illustrated in FIGS. 9A-9B.

While FIG. 8 illustrates the follow-up database 520 including a column indicating the source identification in both the follow-up prompt table 810 and the follow-up action table 820, the disclosure is not limited thereto and this column may indicate a campaign identifier, as described in greater detail below with regard to FIG. 11A. Additionally or alternatively, the follow-up prompt table 810 and/or the follow-up action table 820 may include two columns indicating both the source identification and the campaign identifier without departing from the disclosure.

FIGS. 9A-9B are conceptual diagrams illustrating an example of requesting feedback and then requesting consent based on the feedback response. As illustrated in FIG. 9A, in some examples the remote system 120 may render a first follow-up prompt and/or perform a first follow-up action when the feedback skill 515 receives a first user response responsive to the feedback prompt. For example, FIG. 9A illustrates an example in which the feedback skill 515 receives a negative response (e.g., "No") from the device 110 (step "4"), retrieves a first follow-up prompt associated with the negative response from the follow-up database 520 (step "5"), and sends the first follow-up prompt (e.g., "Thanks for the feedback") to the device 110 (step "6").

In addition, the feedback skill 515 may retrieve a first follow-up action associated with the negative response from the follow-up database 520 (step "7") and may transition to the previous skill (e.g., current skill 290a) (step "8"). For example, the first follow-up action may instruct the feedback skill 515 to transition to the current skill 290a by sending a message to the current skill 290a that includes a first message payload, although the disclosure is not limited thereto. Thus, the feedback skill 515 may pass the interaction back to the current skill 290a and the current skill 290a may perform a first secondary action indicated by the first message payload. In the example illustrated in FIG. 9A, the current skill 290a may perform the first secondary action by sending data representing a consent prompt (e.g., "Can we use this interaction to improve?") to the device 110 (step "9").

While FIG. 9A illustrates an example of the current skill 290a generating a consent prompt, the disclosure is not limited thereto. As described above with regard to FIG. 7, the current skill 290a may perform any secondary action without departing from the disclosure. To illustrate an example, if the remote system 120 receives a negative feedback response (e.g., "No," indicating that the previous system response was not responsive to the original question and/or did not answer the question), the current skill 290a may provide a second system response to attempt to correctly response to the original user query. For example, the current skill 290a may generate the first system response based on a first intent, and, in response to the negative feedback response, may generate the second system response based on a second intent. Additionally or alternatively, the current skill 290a may process the original user query a second time to generate the second system response, although the disclosure is not limited thereto.

To illustrate another example, the current skill 290a may generate a second system response related to the original user query, without trying to answer the original user query. For example, if the original user query corresponds to a request for information about an upcoming concert for a particular artist, the second system response may correspond to other information associated with the particular artist, such as current news, album information, merchandise for sale, and/or the like. Thus, the current skill 290a may generate a second system response that continues the dialog or performs a secondary action other than requesting permission to generate training data without departing from the disclosure.

In contrast, FIG. 9B illustrates an example in which the feedback skill 515 receives an affirmative response (e.g., "Yes") from the device 110 (step "4") and determines that there isn't a follow-up prompt associated with the affirmative response in the follow-up database 520 (step "5"). Thus, the feedback skill 515 does not send a follow-up prompt to the device 110. However, this is intended to conceptually illustrate an example and the disclosure is not limited thereto.

In addition, the feedback skill 515 may retrieve a second follow-up action associated with the affirmative response from the follow-up database 520 (step "6") and may transition to the previous skill (e.g., current skill 290a) (step "7"). For example, the second follow-up action may instruct the feedback skill 515 to transition to the current skill 290a by sending a message to the current skill 290a that includes a second message payload, although the disclosure is not limited thereto. Thus, the feedback skill 515 may pass the interaction back to the current skill 290a and the current skill 290a may perform a second secondary action indicated by the second message payload.

In the example illustrated in FIG. 9B, the current skill 290a may perform the second secondary action by sending data representing a prompt to continue dialog to the device 110 (step "8") without requesting consent or sending a consent prompt to the device 110. However, the disclosure is not limited thereto and the second secondary action may correspond to any action known to one of skill in the art without departing from the disclosure. For example, as described above with regard to FIGS. 7 and 9A, the second secondary action may correspond to a second system response to the original user query, may be related to the original user query, and/or the like without departing from the disclosure.

While FIG. 9B illustrates an example of the follow-up action associated with the affirmative response corresponding to transitioning to the current skill 290a, the disclosure is not limited thereto. Instead, the feedback skill 515 may simply end the interaction without transitioning to the current skill 290a in response to the feedback response. For example, the follow-up action may correspond to an explicit command to end the interaction. However, the disclosure is not limited thereto, and in some examples the follow-up database 520 may not include a follow-up action associated with the affirmative feedback response, the follow-up action may correspond to a null value, and/or the like without departing from the disclosure.

While not illustrated in FIGS. 9A-9B, in some examples the feedback response may be unclear, correspond to silence, and/or the like. In some examples, the feedback skill 515 may treat this type of feedback response as a negative feedback response. For example, the feedback skill 515 may perform a first follow-up action in response to an affirmative feedback response and a second follow-up action in response to both a negative feedback response and an unclear feedback response. However, the disclosure is not limited thereto, and in other examples the feedback skill 515 may treat this type of feedback response as a third category of feedback response without departing from the disclosure. For example, the feedback skill 515 may perform a first follow-up action in response to an affirmative feedback response, a second follow-up action in response to a negative feedback response, and a third follow-up action in response to an unclear feedback response (e.g., "Maybe," silence, indirect response, etc.).

FIG. 10 illustrates examples of expected behavior based on a user response. As represented by Expected Behavior Table 1000 illustrated in FIG. 10, for each feedback response type (e.g., "Yes," "No," "Maybe") there are six different possible expected behaviors. Specifically, the Expected Behavior Table 1000 illustrates six different combinations for a given feedback response type, depending on whether there is a follow-up prompt and/or a follow-up action associated with the feedback response type.

To illustrate a first example, expected behaviors associated with a first feedback response type (e.g., "Yes") are illustrated using six different rows at a top of the Expected Behavior Table 1000. A first group of three rows correspond to examples in which a custom follow-up prompt is present, while a second group of three rows correspond to examples in which a custom follow-up prompt is not present.

The first group of three rows illustrate three examples in which the custom follow-up prompt is present and a follow-up action is only present for a single feedback response type. For example, the first row illustrates a first example in which a follow-up action is present only in the first column of follow-up actions (e.g., Feedback[Yes]), the second row illustrates a second example in which a follow-up action is present only in the second column of follow-up actions (e.g., Feedback[No]), and the third row illustrates a third example in which a follow-up action is present only in the third column of follow-up actions (e.g., Feedback[Maybe]). Thus, the first row illustrates that when the feedback response corresponds to the first feedback response type (e.g., "Yes"), a custom follow-up prompt is present, and a first follow-up action is present in the first column of follow-up actions (e.g., Feedback[Yes]), then the expected behavior is that the feedback skill 515 may render the custom follow-up prompt and perform the first follow-up action (e.g., Feedback[Yes]). For example, the feedback skill 515 may send data representing the follow-up prompt to the device 110 and then transition to the current skill 290a.

In some examples, the feedback skill 515 may transition to the current skill 290a by sending a message that includes a message payload indicated by the first follow-up action. For example, the message payload may instruct the current skill 290a to perform a first secondary action (e.g., generate a consent prompt). However, the disclosure is not limited thereto and in some examples the message payload may include the feedback response or other information and the current skill 290a may determine to perform the first secondary action based on the feedback response. Thus, the first follow-up action corresponds to a first action performed by the feedback skill 515 (e.g., transitioning to the current skill 290a and/or including a message payload), while the first secondary action corresponds to an optional second action performed by the current skill 290a (e.g., generating a consent prompt).

In contrast, the second and third rows illustrate that when the feedback response corresponds to the first feedback response type (e.g., "Yes"), a custom follow-up prompt is present, and a follow-up action is present only in the second column of follow-up actions (e.g., Feedback[No]) and/or the third column of follow-up actions (e.g., Feedback[Maybe]) [but not the first column of follow-up actions (e.g., Feedback[Yes])], then the expected behavior is that the feedback skill 515 may only render the custom follow-up prompt. For example, the feedback skill 515 may send the data representing the follow-up prompt to the device 110 and then end the interaction (e.g., without transitioning to the current skill 290a) without departing from the disclosure.

The second group of three rows illustrate three examples in which the custom follow-up prompt is not present and a follow-up action is present for a single feedback response type. For example, the first row illustrates a first example in which a follow-up action is present only in the first column of follow-up actions (e.g., Feedback[Yes]), the second row illustrates a second example in which a follow-up action is present only in the second column of follow-up actions (e.g., Feedback[No]), and the third row illustrates a third example in which a follow-up action is present only in the third column of follow-up actions (e.g., Feedback[Maybe]). Thus, the first row illustrates that when the feedback response corresponds to the first feedback response type (e.g., "Yes"), a custom follow-up prompt is not present, and a first follow-up action is present in the first column of follow-up actions (e.g., Feedback[Yes]), then the expected behavior is that the feedback skill 515 may perform the first follow-up action (e.g., Feedback[Yes]). For example, the feedback skill 515 may transition to the current skill 290a.

In some examples, the feedback skill 515 may transition to the current skill 290a by sending a message that includes a message payload indicated by the first follow-up action. For example, the message payload may instruct the current skill 290a to perform a first secondary action (e.g., generate a consent prompt). However, the disclosure is not limited thereto and in some examples the message payload may include the feedback response or other information and the current skill 290a may determine to perform the first secondary action based on the feedback response. Thus, the first follow-up action corresponds to a first action performed by the feedback skill 515 (e.g., transitioning to the current skill 290a and/or including a message payload), while the first secondary action corresponds to an optional second action performed by the current skill 290a (e.g., generating a consent prompt).

In contrast, the second and third rows illustrate that when the feedback response corresponds to the first feedback response type (e.g., "Yes"), a custom follow-up prompt is not present, and a follow-up action is present only in the second column of follow-up actions (e.g., Feedback[No]) and/or the third column of follow-up actions (e.g., Feedback [Maybe]) [but not the first column of follow-up actions (e.g., Feedback[Yes])], then the expected behavior is that the feedback skill 515 may do nothing. For example, the feedback skill 515 may end the interaction (e.g., without transitioning to the current skill 290a) without departing from the disclosure.

The Expected Behavior Table 1010 illustrates similar examples for each of a second feedback response type (e.g., "No") and a third feedback response type (e.g., "Maybe"). As these examples mirror the examples described above with regard to the first feedback response type (e.g., "Yes"), a redundant description is omitted. Similarly, while FIG. 10 illustrates examples in which a follow-up action is only present in a single column, the disclosure is not limited thereto and these examples can be extended to when links are present in two or more columns. For example, for each feedback response type, the feedback skill 515 may determine whether a follow-up action is present in the corresponding column. If a follow-up action is present, the feedback skill 515 may use the follow-up action to pass the interaction back to the current skill 290a and/or to send a command to the current skill 290a to perform a secondary action. If a follow-up action is not present, the feedback skill 515 may simply end the interaction.

While FIG. 10 illustrates examples of transitioning the interaction to the current skill 290a in response to different feedback responses (e.g., "Yes," "No," "Maybe"), the current skill 290a may perform different secondary actions based on the feedback responses and/or the follow-up actions performed. For example, a first follow-up action associated with affirmative feedback (e.g., "Yes") may cause the feedback skill 515 to send a first message to the current skill 290a, while a second follow-up action associated with negative feedback (e.g., "No") may cause the feedback skill 515 to send a second message to the current skill 290a. In response to receiving the first message, the current skill 290a may perform a first secondary action (e.g., continue the dialog), whereas in response to receiving the second message the current skill 290a may perform a second secondary action (e.g., request consent). Thus, the follow-up action may indicate the message payload to include when transitioning to the current skill 290a and the current skill 290a may respond differently based on the message payload.

Figure 11A:
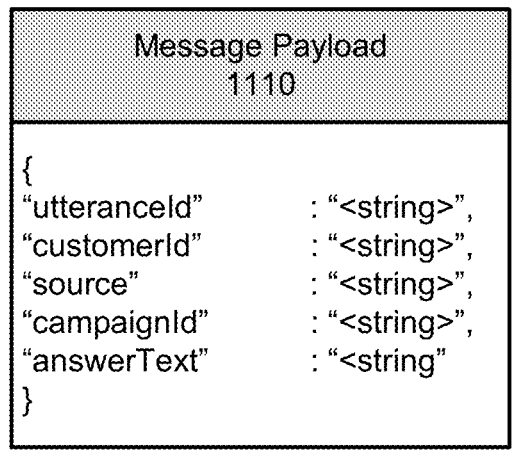
FIGS. 11A-11B illustrate examples of message payloads passed from a current skill to a feedback skill and from the feedback skill back to the current skill.
Figure 11B:
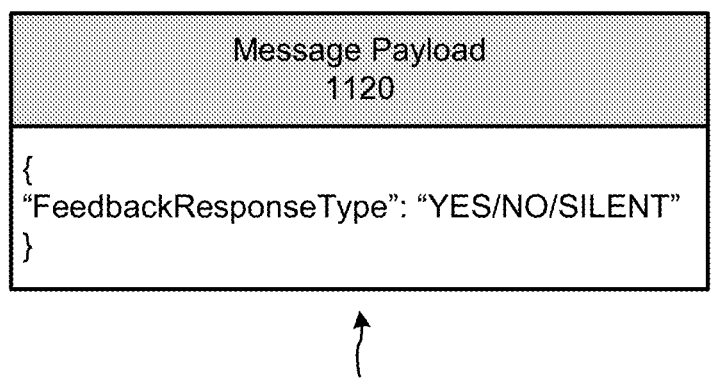

FIGS. 11A-11B illustrate examples of message payloads passed from a current skill to a feedback skill and from the feedback skill back to the current skill. As described above, the current skill 290a may transition to the feedback skill 515 in order to enable the remote system 120 to request feedback. The message payload sent to the feedback skill 515 may include information that the feedback skill 515 may use to pass the interaction back to the current skill (e.g., after receiving the feedback response) and/or to associate the feedback response with a corresponding utterance, user profile, and/or the like.

FIG. 11A illustrates an example of a message payload 1110 that is included in the link passing the interaction from the current skill 290a to the feedback skill 515. As illustrated in FIG. 11A, the message payload 1110 may include a series of fields, with each field containing a string of data. For example, the message payload 1110 may include a first field indicating an utterance identifier (e.g., "utteranceId"), a second field indicating a customer identifier (e.g., "customerId"), a third field indicating a source identifier (e.g., "source"), a fourth field indicating a campaign identifier (e.g., "campaignId"), and a fifth field indicating text data (e.g., "answerText"), although the disclosure is not limited thereto.

The utterance identifier may indicate a particular utterance or dialog associated with the feedback response. For example, the remote system 120 may use the utterance identifier to associate the feedback response with the utterance that preceded the feedback request. Similarly, the customer identifier may indicate a particular user profile and/or account associated with the utterance, although the disclosure is not limited thereto. The text data may correspond to the original user query, the system response, and/or the like without departing from the disclosure.

The source identifier may indicate a source of the feedback request, such as the current skill 290a that transitioned to the feedback skill 515. The source identifier may be used to pass the interaction back to the current skill 290a after receiving the feedback response. Similarly, the campaign identifier may indicate a particular feedback elicitation use-case. For example, a single source identifier (e.g., Skill1) may be associated with multiple different feedback elicitation use-cases, enabling the remote system 120 to request feedback in different ways depending on the context. Thus, the remote system 120 may generate a first follow-up prompt and/or first follow-up action for a first campaign identifier (e.g., in a first situation) and may generate a second follow-up prompt and/or second follow-up action for a second campaign identifier (e.g., in a second situation), despite the source identifier being the same. For example, the first campaign identifier may be used when the utterance/dialog corresponds to a first category of information, while the second campaign identifier may be used when the utterance/dialog corresponds to a second category of information, although the disclosure is not limited thereto. Additionally or alternatively, the campaign identifier may distinguish between time of day, number of previous feedback prompts, previous feedback responses, previous consent responses, and/or the like without departing from the disclosure. While FIG. 8 illustrates the follow-up database 520 including a column indicating the source identification, the disclosure is not limited thereto and this column may indicate the campaign identifier and/or follow-up database 520 may include two columns indicating both the source identification and the campaign identifier without departing from the disclosure.

FIG. 11B illustrates an example of a message payload 1120 that is included when passing the interaction from the feedback skill 515 to the current skill 290a. As illustrated in FIG. 11B, the message payload 1120 may include a single field indicating a type of feedback response (e.g., "FeedbackResponseType"), although the disclosure is not limited thereto. Examples of the type of feedback response include "Yes," "No," "Silent," "Maybe," and/or the like. In some examples, the current skill 290a may determine a secondary action to perform based on the type of feedback response. For example, the current skill 290a may perform a first secondary action (e.g., generate a consent prompt) in response to a first type of feedback response (e.g., "No") but may perform a second secondary action (e.g., generate a prompt to continue dialog) in response to a second type of feedback response (e.g., "Yes"). However, the disclosure is not limited thereto, and in other examples the message payload 1120 may include the secondary action, a command instructing the current skill 290*a* to perform the secondary action, and/or the like, enabling the remote system 120 to perform multiple different secondary actions in response to a single type of feedback response.

If the message to the feedback skill 515 includes the message payload 1110, the remote system 120 may use the source identifier and/or the campaign identifier to determine the follow-up prompt and/or the follow-up action to perform. For example, the follow-up database 520 may include a column indicating the source identifier or the campaign identifier, with additional columns indicating follow-up prompt(s) and/or follow-up action(s) associated with the source/campaign identifier. Additionally or alternatively, the follow-up database 520 may include two columns indicating both the source identifier and the campaign identifier, with additional columns indicating follow-up prompt(s) and/or follow-up action(s) associated with the source identifier and the campaign identifier, although the disclosure is not limited thereto.

Figure 12:
FIG. 12 illustrates an example of a message payload passed from a current skill to a feedback skill.

In some examples, the message to the feedback skill 515 may include a secondary action without departing from the disclosure. FIG. 12 illustrates an example of a message payload 1210 included in a message passing the interaction from a current skill 290*a* to the feedback skill 515. As illustrated in FIG. 12, the message payload 1210 may include a series of fields, with each field containing a string of data. For example, the message payload 1210 may include a first field indicating an utterance identifier (e.g., "utteranceId"), a second field indicating a customer identifier (e.g., "customerId"), a third field indicating a source identifier (e.g., "source"), a fourth field indicating text data (e.g., "answerText"), and a fifth field indicating a follow-up action (e.g., "follow-up-action"), although the disclosure is not limited thereto.

If the message to the feedback skill 515 includes the message payload 1210, the remote system 120 may store the follow-up action and perform the follow-up action when transitioning back to the current skill 290*a*. Thus, in this example, the follow-up database 520 may not include the follow-up action, as the feedback skill 515 receives this information directly from the message payload 1210. However, the disclosure is not limited thereto and in some examples the feedback skill 515 may update the follow-up database 520 to store the follow-up action while requesting the feedback from the device 110 without departing from the disclosure.

As described above, the remote system 120 may use the source identifier to determine the follow-up prompt and/or to transition to the current skill 290*a* after receiving the feedback response. For example, the follow-up database 520 may include a column indicating the source identifier, with additional column(s) indicating follow-up prompt(s) associated with the source identifier. While FIG. 12 does not illustrate the message payload 1210 including a campaign identifier, the disclosure is not limited thereto and the message payload 1210 may include the campaign identifier in addition to or in replace of the source identifier without departing from the disclosure.

Referring back to FIG. 6, after receiving the consent response from the device 110 (step "11"), the remote system 120 may record the consent response in the permission database 640 (step "12"). FIG. 13 illustrates an example of information included in the permission database 640. As illustrated in FIG. 13, an entry (e.g., row) in the permission database 640 may correspond to a series of fields (e.g., columns). For example, the permission database 640 may include a first column indicating an utterance identification (e.g., <UtteranceID>), a second column indicating a customer identification (e.g., <CustomerID>), a third column indicating a response timestamp (e.g., <Timestamp>), a fourth column indicating a response type (e.g., "Yes, "No," "Maybe," etc.), and a fifth column indicating follow-up identification(s) (e.g., customer answer utterance identifications, such as utterance identifiers corresponding to the consent response), although the disclosure is not limited thereto.

As illustrated in FIG. 13, the permission database 640 may include affirmative consent responses indicating that permission is granted (e.g., rows 1 and 3-4) as well as negative consent responses indicating that permission is denied (e.g., row 2). For affirmative consent responses, the permission database 640 may include an utterance identification (e.g., Utterance ID3) corresponding to the affirmative consent response, enabling the remote system 120 to store a reference to the exact audio granting permission to perform additional processing. In addition, the permission database 640 may include a customer identification (e.g., ABCDEFGHIJKLM123), a response timestamp (e.g., 2020-02-01T08:06:30), a response type indicating that the consent response was affirmative (e.g., "Yes"), a list of all related utterances (e.g., Utterance ID1, Utterance ID2, etc.) associated with the dialog, and/or the like, although the disclosure is not limited thereto. For example, the first row of the permission database 640 indicates that a third utterance (e.g., Utterance ID3) represented the consent response that granted permission to the remote system 120 to perform additional processing using a first utterance (e.g., Utterance ID1) and a second utterance (e.g., Utterance ID2).

In contrast, the second row of the permission database 640 illustrates an example of a negative consent response. For negative consent responses the permission database 640 may only include a customer identification (e.g., ABCDEFGHIJKLM123), a response timestamp (e.g., 2020-02-01T08:23:00), a response type indicating that the consent response was negative (e.g., "No"), and/or the like. However, while FIG. 13 illustrates an example of the permission database 640 including a negative consent response, the disclosure is not limited thereto and the remote system 120 may ignore negative consent responses without departing from the disclosure.

Including entries for the negative consent responses enables the remote system 120 to keep track of how often the remote system 120 requests permission to perform additional processing, how often the user grants permission to perform additional processing, how often the user denies permission to perform additional processing, and/or the like. For example, the remote system 120 may limit the number of times that the remote system 120 requests permission to perform additional processing. Additionally or alternatively, the remote system 120 may stop requesting permission to perform additional processing after the permission is denied a number of times in a row or the like.

Figure 14A:
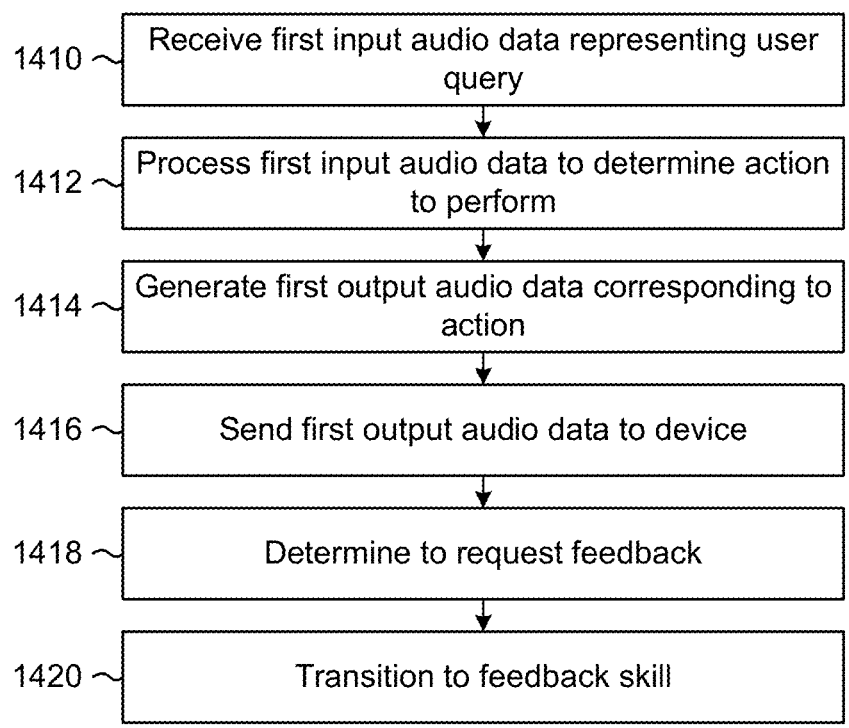

FIGS. 14A-14E are flowcharts conceptually illustrating an example method for requesting feedback and consent. As illustrated in FIG. 14A, the remote system 120 may receive (1410) first input audio data representing a user query from the device 110, may process (1412) the first input audio data to determine an action to perform, may generate (1414) first output audio data corresponding to the action, and may send (1416) the first output audio data to the device 110. While FIG. 14A illustrates the remote system 120 receiving first input audio data and sending first output audio data, the disclosure is not limited thereto and the remote system 120 may receive first input data (e.g., text data or the like) and may generate and send first output data (e.g., text data or the like) without departing from the disclosure.

The remote system 120 may determine (1418) to request feedback and may transition (1420) to a feedback skill, as described above with regard to FIGS. 5-6. For example, the remote system 120 may process the first input audio data using a first skill 290*a* and may request feedback using a second skill (e.g., feedback skill 515).

As illustrated in FIG. 14B, the remote system 120 (e.g., the feedback skill 515 within the remote system 120, although the disclosure is not limited thereto) may receive (1430) the interaction from the first skill, may generate (1432) second output audio data requesting feedback, and may send (1434) the second output audio data to the device 110. In response to the second output audio data, the remote system 120 may receive (1436) second input audio data corresponding to a feedback response, may process (1438) the second input audio data to determine the feedback response, may determine (1440) a follow-up prompt based on the feedback response, may generate (1442) third output audio data corresponding to the follow-up prompt, and may send (1444) the third output audio data to the device 110, as described in greater detail above with regard to FIGS. 5-6.

The remote system 120 (e.g., feedback skill 515, although the disclosure is not limited thereto) may determine (1446) a follow-up action to perform and may transition (1448) to the first skill, as described in greater detail above with regard to FIG. 6. For example, the remote system 120 may retrieve the follow-up action or other information from the follow-up database 520 and transition to the first skill based on the follow-up action or other information. In some examples, the remote system 120 may transition to the first skill by sending a message to the first skill including a message payload, although the disclosure is not limited thereto.

Figure 14C:
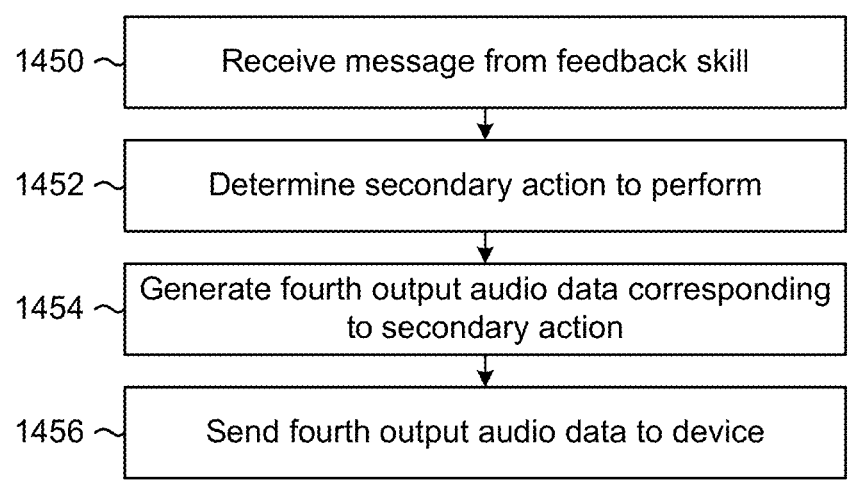

As illustrated in FIG. 14C, the remote system 120 (e.g., first skill 290*a*) may receive (1450) a message from the feedback skill 515, may determine (1452) a secondary action to perform based on the message, may generate (1454) fourth output audio data corresponding to the secondary action, and may send (1456) the fourth output audio data to the device 110, as described in greater detail above with regard to FIG. 6. In some examples, the secondary action may correspond to generating a consent prompt requesting permission to perform additional processing, although the disclosure is not limited thereto.

Figure 14D:
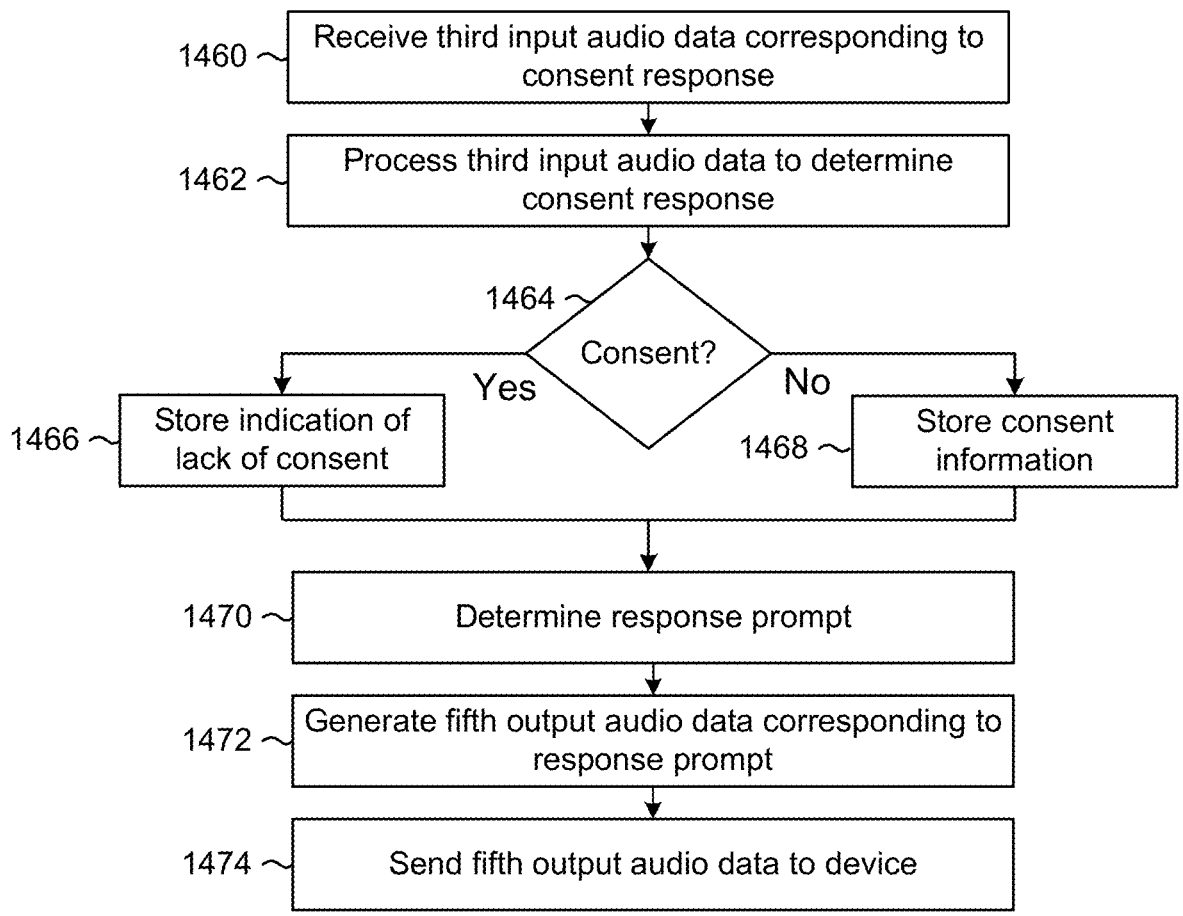

FIG. 14D illustrates an example in which the secondary action corresponds to generating a consent prompt, such that the fourth output data represents the consent prompt. As illustrated in FIG. 14D, the remote system 120 may receive (1460) third input audio data corresponding to a consent response, may process (1462) the third input audio data to determine the consent response, and may determine (1464) whether consent has been given. If the consent response indicates that consent has been given (e.g., affirmative consent response), the remote system 120 may store (1466) the consent information, such as in a permission database 640, as described above with regard to FIGS. 6 and 13. In some examples, if the consent response indicates that consent has been denied (e.g., negative consent response), the remote system 120 may store (1468) the consent information, such as in the permission database 640, although the disclosure is not limited thereto.

Regardless of the consent response, the remote system 120 may determine (1470) a response prompt, may generate (1472) fifth output audio data corresponding to the response prompt, and may send (1474) the fifth output audio data to the device 110, as described above with regard to FIG. 6.

Figure 14E:
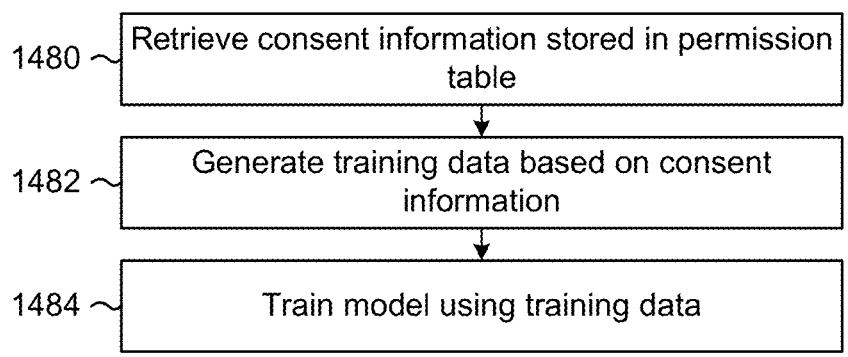

As illustrated in FIG. 14E, the remote system 120 may retrieve (1480) consent information stored in the permission database 640, may generate (1482) training data based on the consent information, and may train (1484) a model using the training data. For example, the remote system 120 may periodically pull utterance data from the permission database 640 and process the utterance data to improve future interactions.

Figure 15:
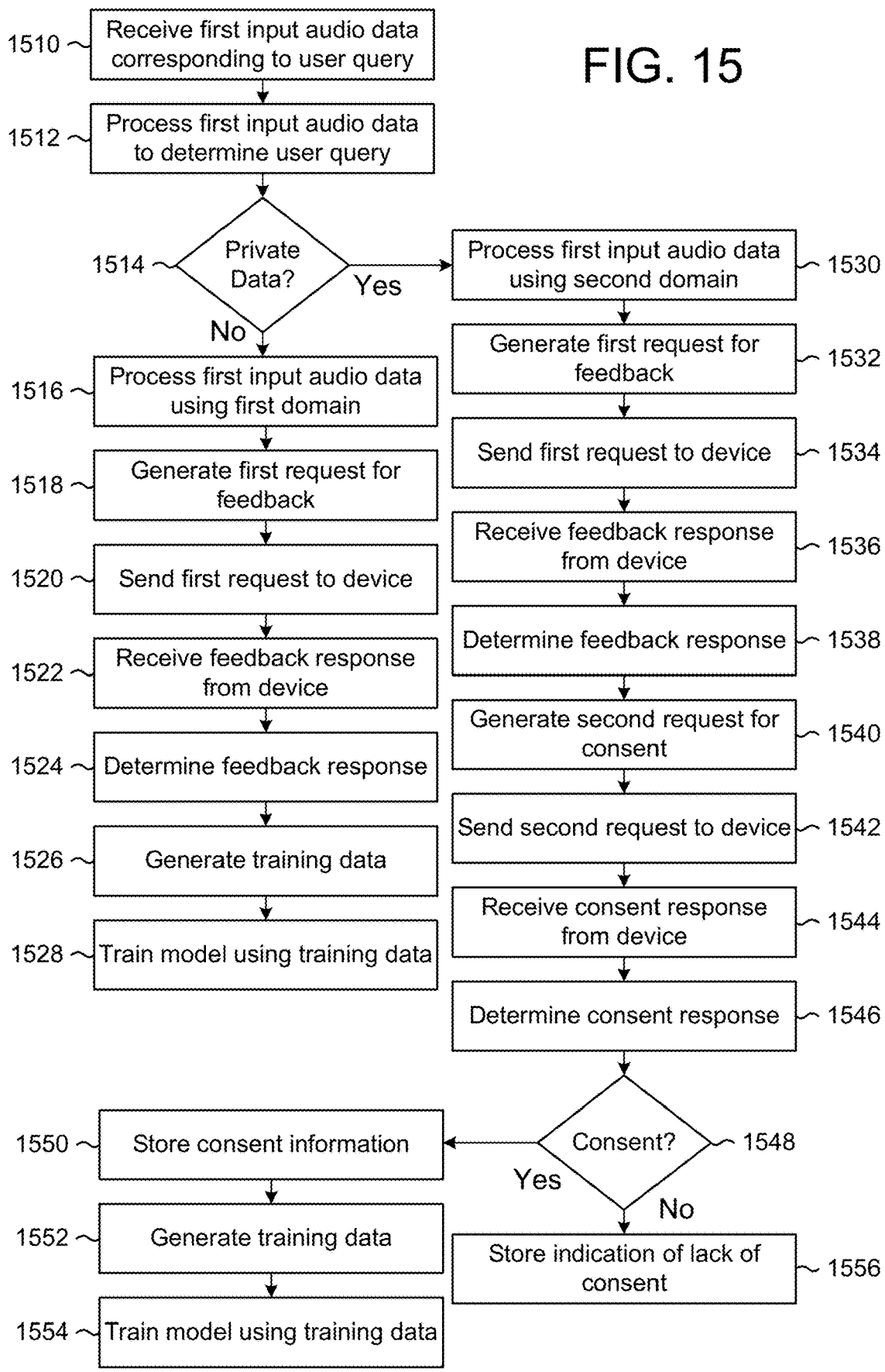
FIG. 15 is a flowchart conceptually illustrating an example method for generating a consent prompt for a domain associated with private data.

FIG. 15 is a flowchart conceptually illustrating an example method for generating a consent prompt for a domain associated with private data. As illustrated in FIG. 15, the remote system 120 may receive (1510) first input audio data corresponding to a user query, may process (1512) the first input audio data to determine the user query, and may determine (1514) whether the user query corresponds to private data or not. For example, the remote system 120 may determine whether the user query is associated with information that is specific to a user profile or is general information (e.g., public knowledge).

If the user query does not correspond to private data, the remote system 120 may process (1516) the first input audio data using a first domain and may perform an action corresponding to the user query. For example, the remote system 120 may generate output audio data representing synthesized speech and may send the output audio data to the device 110, although the disclosure is not limited thereto. After the interaction is complete, the remote system 120 may generate (1518) a first request for feedback, may send (1520) the first request to the device 110, may receive (1522) a feedback response from the device 110, may determine (1524) the feedback response, may generate (1526) training data, and may train (1528) a model using the training data using any techniques known to one of skill in the art. For example, the remote system 120 may receive audio data representing the feedback response, may process the audio data to determine the feedback response, and then may generate the training data based on the previous interaction. As the user query is not associated with private data, the remote system 120 may not specifically request consent to generate the training data and/or train the model, although the disclosure is not limited thereto.

In contrast, if the remote system 120 determines in step 1514 that the user query corresponds to private data, the remote system 120 may process (1530) the first input audio data using a second domain (e.g., personal data system 630, although the disclosure is not limited thereto) and may perform an action corresponding to the user query. For example, the remote system 120 may generate output audio data representing synthesized speech and may send the output audio data to the device 110, although the disclosure is not limited thereto. After the interaction is complete, the remote system 120 may generate (1532) a first request for feedback, may send (1534) the first request to the device 110, may receive (1536) a feedback response from the device 110, and may determine (1538) the feedback response.

As the user query is associated with private data and/or the second domain, the remote system 120 may generate (1540) a second request for consent and send (1542) the second request to the device 110. For example, the remote system 120 may generate audio data representing a consent prompt, as described in greater detail above with regard to FIG. 6. In some examples, the remote system 120 may generate the second request for consent based on the feedback response, although the disclosure is not limited thereto.

The remote system 120 may receive (1544) a consent response from the device 110, may determine (1546) the consent response, and may determine (1548) whether the consent response corresponds to consent to generate training data. If the consent response grants permission (e.g., affirmative response), the remote system 120 may store (1550) consent information and, at a later point in time, may generate (1552) training data and may train (1554) a model using the training data using any techniques known to one of skill in the art. For example, the remote system 120 may receive audio data representing the feedback response, may process the audio data to determine the feedback response, and then may generate the training data based on the previous interaction.

If the consent response does not give permission (e.g., negative response, or unclear response) in step 1548, the remote system 120 may optionally store (1556) consent information indicating that permission was denied. For example, the remote system 120 may not store identifier(s) for the utterance(s), but may include an identifier for the user (e.g., customer ID), time information associated with the consent response, an indication that the consent response was negative (e.g., "No"), and/or the like. Thus, the remote system 120 may keep track of how often the remote system 120 requests permission to perform additional processing, how often the user grants permission to perform additional processing, how often the user denies permission to perform additional processing, and/or the like. For example, the remote system 120 may limit the number of times that the remote system 120 requests permission to perform additional processing. Additionally or alternatively, the remote system 120 may stop requesting permission to perform additional processing after the permission is denied a number of times in a row or the like.

As described above with regard to FIGS. 5-9B, the remote system 120 may performs steps 1510-1554 using a combination of current skill 290 (e.g., first skill 290a or second skill 290b) and a feedback skill 515. For example, the remote system 120 may initially process the user query using the first skill 290a in step 1516, may request feedback using the feedback skill 515 in steps 1518-1524, and may perform additional processing using the first skill 290a and/or a different skill in steps 1526-1528.

Similarly, the remote system 120 may initially process the user query using the second skill 290b in step 1530, may request feedback using the feedback skill 515 in steps 1532-1538, and then may perform additional processing (e.g., request consent) using the second skill 290b in steps 1540-1550. However, the disclosure is not limited thereto, and in some examples the remote system 120 may perform all of the steps illustrated in FIG. 15 using a single skill without departing from the disclosure. For example, a single skill may be configured to generate the system response, request a feedback response, and/or perform a secondary action (e.g., request permission to perform additional processing using utterances included within the dialog) without departing from the disclosure.

Figure 16:
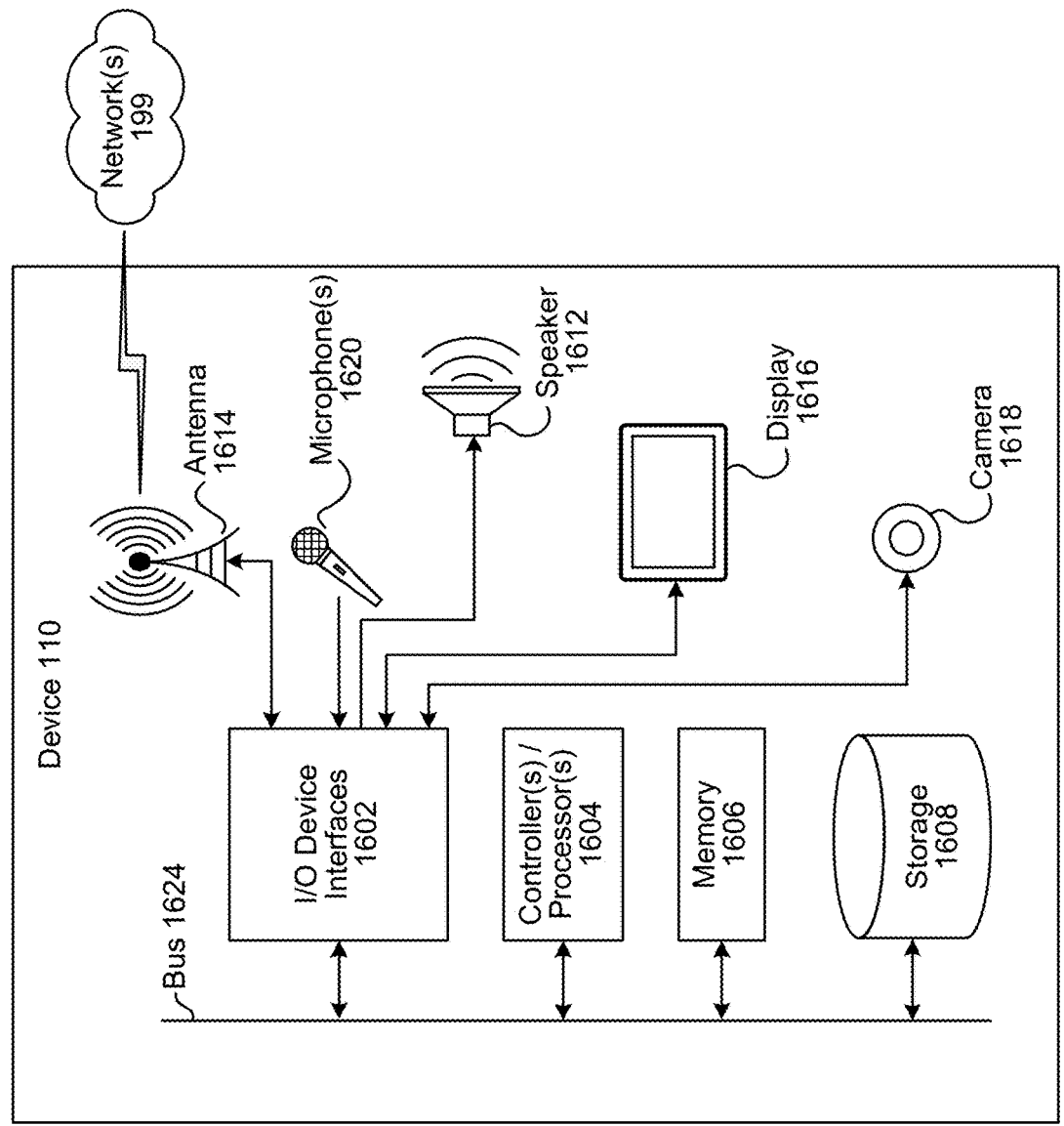
FIG. 16 is a block diagram conceptually illustrating example components of a device.
Figure 17:
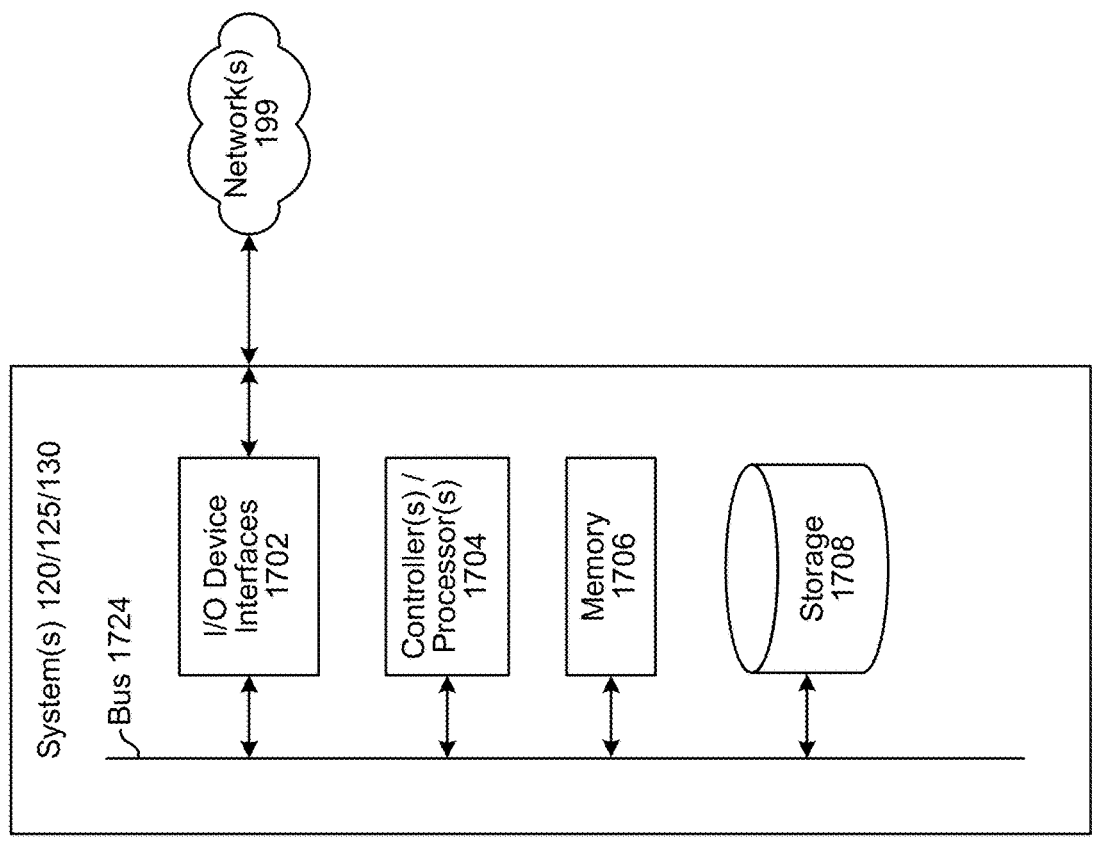
FIG. 17 is a block diagram conceptually illustrating example components of a system.

FIG. 16 is a block diagram conceptually illustrating a device 110 that may be used with the system. FIG. 17 is a block diagram conceptually illustrating example components of a remote device, such as the natural language processing remote system 120, which may assist with ASR processing, NLU processing, etc.; skill system(s) 125; and content provider(s) 130. A system (120/125/130) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125/130) may be included in the overall system 100 of the present disclosure, such as one or more natural language processing systems 120 for performing ASR processing, one or more natural language processing systems 120 for performing NLU processing, one or more skill systems 125, one or more content providers 130, etc. In operation, each of these systems may include computer-readable and computer-executable instructions that reside on the respective device (120/125), as will be discussed further below.

Each of these devices (110/120/125/130) may include one or more controllers/processors (1604/1704), which may each include a central processing unit (CPU) for processing data and computer-readable instructions, and a memory (1606/1706) for storing data and instructions of the respective device. The memories (1606/1706) may individually include volatile random access memory (RAM), non-volatile read only memory (ROM), non-volatile magnetoresistive memory (MRAM), and/or other types of memory. Each device (110/120/125/130) may also include a data storage component (1608/1708) for storing data and controller/processor-executable instructions. Each data storage component (1608/1708) may individually include one or more non-volatile storage types such as magnetic storage, optical storage, solid-state storage, etc. Each device (110/120/125/130) may also be connected to removable or external non-volatile memory and/or storage (such as a removable memory card, memory key drive, networked storage, etc.) through respective input/output device interfaces (1602/1702).

Computer instructions for operating each device (110/120/125/130) and its various components may be executed by the respective device's controller(s)/processor(s) (1604/1704), using the memory (1606/1706) as temporary "working" storage at runtime. A device's computer instructions may be stored in a non-transitory manner in non-volatile memory (1606/1706), storage (1608/1708), or an external device(s). Alternatively, some or all of the executable instructions may be embedded in hardware or firmware on the respective device in addition to or instead of software.

Each device (110/120/125/130) includes input/output device interfaces (1602/1702). A variety of components may be connected through the input/output device interfaces (1602/1702), as will be discussed further below. Additionally, each device (110/120/125/130) may include an address/data bus (1624/1724) for conveying data among components of the respective device. Each component within a device (110/120/125/130) may also be directly connected to other components in addition to (or instead of) being connected to other components across the bus (1624/1724).

Referring to FIG. 16, the device 110 may include input/output device interfaces 1602 that connect to a variety of components such as an audio output component such as a speaker 1612, a wired headset or a wireless headset (not illustrated), or other component capable of outputting audio. The device 110 may also include an audio capture component. The audio capture component may be, for example, a microphone 1620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1616 for displaying content. The device 110 may further include a camera 1618.

Via antenna(s) 1614, the input/output device interfaces 1602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1602/1702) may also include communication components that allow data to be exchanged between devices such as different physical servers in a collection of servers or other components.

The components of the device 110, the natural language processing remote system 120, skill system(s) 125, and/or content provider(s) 130 may include their own dedicated processors, memory, and/or storage. Alternatively, one or more of the components of the device 110, the natural language processing remote system 120, skill system(s) 125, and/or content provider(s) 130 may utilize the I/O interfaces (1602/1702), processor(s) (1604/1704), memory (1606/1706), and/or storage (1608/1708) of the device(s) 110, natural language processing remote system 120, the skill system(s) 125, or the content provider(s) 130, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language processing remote system 120, skill system(s) 125, and content provider(s) 130, as described herein, are illustrative, and may be located as a stand-alone device or may be included, in whole or in part, as a component of a larger device or system.

Figure 18:
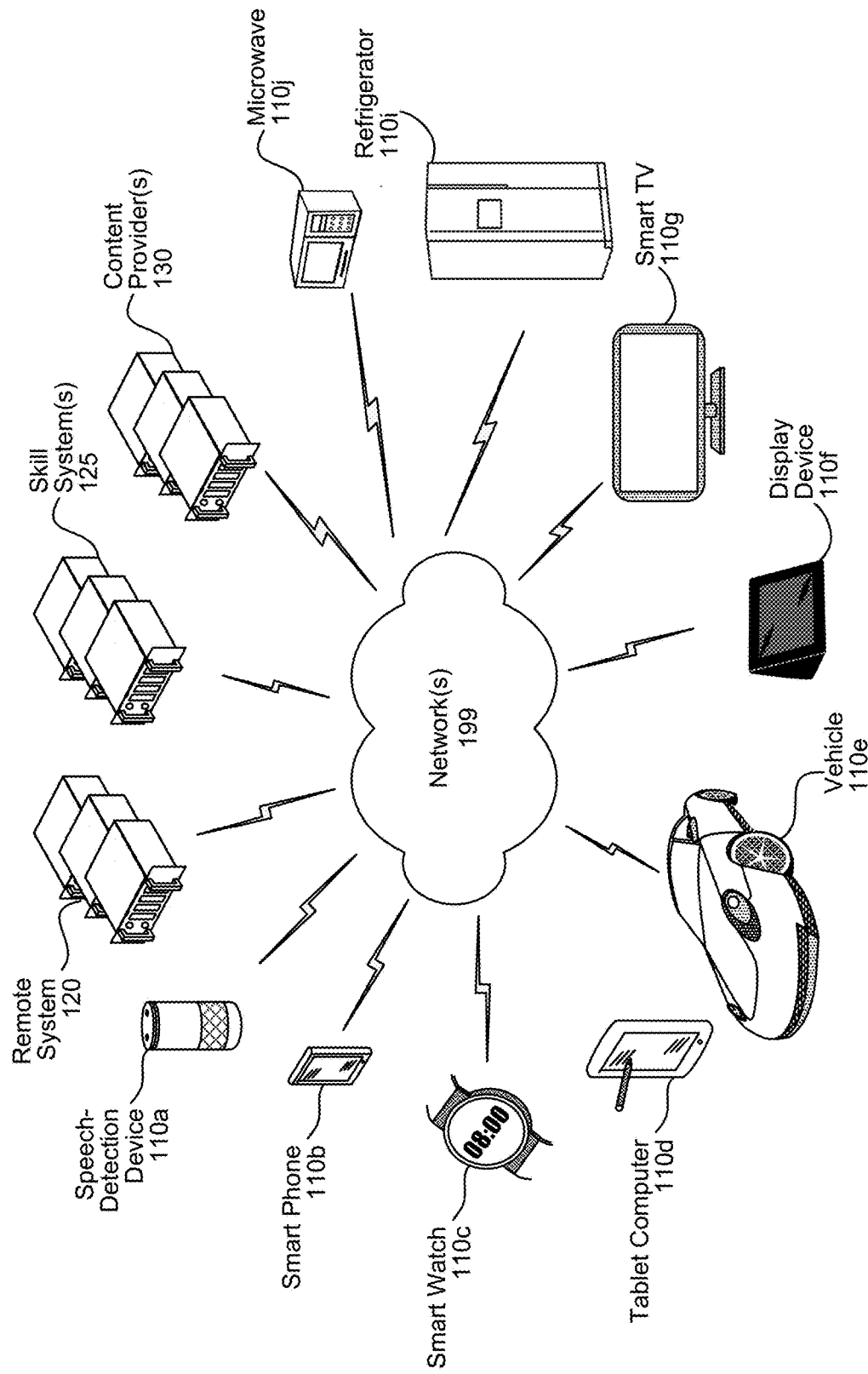
FIG. 18 illustrates an example of a computer network for use with the overall system.

As illustrated in FIG. 18, multiple devices (110a-110i, 120, 125, 130) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a refrigerator 110h, and/or a microwave 110i may be connected to the network(s) 199 through a wireless service provider, over a WiFi or cellular network connection, or the like. Other devices are included as network-connected support devices, such as the natural language processing remote system 120, the skill system(s) 125, the content provider(s) 130, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language processing remote system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a first device, first input data representing a first natural language input corresponding to a first dialog;
   determining first output data responsive to the first natural language input;
   sending the first output data to the first device;
   generating second output data requesting feedback associated with the first dialog;
   sending the second output data to the first device;
   receiving, from the first device, second input data representing a second natural language input;
   processing the second input data to determine feedback data, the feedback data indicating that the first output data was not responsive to the first input data;
   determining, using the feedback data, a first action to perform;
   determining, using at least one of the first input data or the first output data, that performing the first action requires receiving permission to share the first input data and the first output data;
   generating third output data corresponding to the first action, the third output data requesting the permission to share the first input data and the first output data;
   sending the third output data to the first device;
   receiving, from the first device, third input data representing a third natural language input;
   processing the third input data to determine that the permission is granted; and
   storing first data indicating that the permission is granted to share the first input data and the first output data.

2. The computer-implemented method of claim 1, wherein generating the third output data further comprises:
   generating first audio data representing synthesized speech,
   wherein receiving the third input data further comprises:
   receiving second audio data representing an utterance,
   wherein processing the third input data further comprises:
   processing the second audio data to determine that the second audio data grants the permission to share the first input data and the first output data, and
   wherein storing the first data further comprises:
   storing the third input data;
   storing an indication that the permission is granted to share the first input data and the first output data;
   storing a first identifier corresponding to the first dialog; and
   storing a second identifier of a user profile associated with the first identifier.

3. The computer-implemented method of claim 1, further comprising:
   receiving fourth input data representing a fourth natural language input corresponding to a second dialog;
   determining fourth output data responsive to the fourth natural language input;
   sending the fourth output data to the first device;
   generating fifth output data requesting feedback associated with the second dialog;
   sending the fifth output data to the first device;
   receiving, from the first device, sixth input data representing a fifth natural language input;
   processing the sixth input data to determine second feedback data, the second feedback data indicating that the fourth output data was responsive to the fourth input data;
   determining, using the second feedback data, a second action to perform; and
   causing the second action to be performed.

4. A computer-implemented method comprising:
   receiving, from a first device, first input data representing a first natural language input corresponding to a first dialog;
   determining first output data responsive to the first natural language input;
   sending the first output data to the first device;
   determining to perform additional processing using at least one of the first input data or the first output data;
   determining, based at least in part on at least one of the first input data and the first output data, that a first permission is needed for the additional processing;
   generating second output data requesting the first permission to authorize the additional processing;
   receiving second input data representing the first permission to perform the additional processing; and
   in response to receiving the second input data, causing a first action to be performed.

5. The computer-implemented method of claim 4, wherein determining that the first permission is needed for the additional processing further comprises:
   performing natural language processing on at least one of the first input data or the first output data to determine that at least one of the first input data or the first output data includes sensitive information; and
   determining that the first permission is needed for the additional processing.

6. The computer-implemented method of claim 4, further comprising:
   receiving, from the first device, third input data representing a second natural language input corresponding to a second dialog;
   determining third output data responsive to the second natural language input;
   sending the third output data to the first device;
   determining to perform the additional processing using the second dialog;
   determining, based at least in part on at least one of the third input data or the third output data, that a second permission is needed to perform the additional processing using the second dialog;
   determining that the second permission satisfies a condition; and
   causing the first action to be performed using the second dialog.

7. The computer-implemented method of claim 4, further comprising:
   performing user recognition processing on the first input data to determine a first user profile;
   performing user recognition processing on the second input data to determine that the second input data corresponds to the first user profile; and in response to the second input data corresponding to the first user profile, causing the first action to be performed with regard to the first dialog.

8. The computer-implemented method of claim 4, further comprising:
determining that a first skill requires second permission to access first data corresponding to the first dialog;
generating third output data requesting the second permission to authorize the first skill to access the first data;
receiving third input data representing the second permission; and
in response to receiving the third input data, granting the first skill access to the first data.

9. The computer-implemented method of claim 4, wherein generating the second output data further comprises:
generating first audio data representing synthesized speech,
wherein receiving the second input data further comprises:
receiving second audio data representing an utterance, and
wherein causing the first action to be performed further comprises:
processing the second audio data to determine that the second input data grants the first permission to perform the additional processing with regard to the first dialog; and
storing first data that includes at least the second audio data, an indication that the first permission to perform the additional processing is granted, and an identifier associated with the first dialog.

10. The computer-implemented method of claim 4, wherein determining to perform the additional processing further comprises:
generating third output data requesting feedback corresponding to the first output data;
sending the third output data to the first device;
receiving, from the first device, third input data responsive to the third output data;
processing the third input data to determine that the third input data indicates a type of feedback; and
determining, using the type of feedback, to perform the additional processing using the first dialog.

11. The computer-implemented method of claim 4, further comprising:
receiving third input data representing a second natural language input corresponding to a second dialog;
determining third output data responsive to the second natural language input;
generating fourth output data requesting feedback corresponding to the third output data;
receiving fourth input data responsive to the fourth output data;
processing the fourth input data to determine that the fourth input data indicates a type of feedback;
determining, using the type of feedback, a second action to perform;
causing the second action to be performed.

12. The computer-implemented method of claim 4, wherein determining the first output data further comprises determining the first output data using a first skill, and the method further comprises:
sending, from the first skill to a second skill, first data including a first identifier associated with a second action to perform and a second identifier associated with the first skill;
generating, using the second skill, third output data requesting feedback corresponding to the first output data;
receiving, by the second skill, third input data responsive to the third output data;
processing, by the second skill, the third input data to determine that the third input data indicates a type of feedback;
determining, by the second skill using the first identifier and the second identifier, the second action to perform; and
performing the second action by sending second data from the second skill to the first skill, the second data indicating the type of feedback,
wherein determining to perform the additional processing further comprises determining, by the first skill using the type of feedback, to perform the additional processing.

13. A system comprising:
at least one processor; and
memory including instructions operable to be executed by the at least one processor to cause the system to:
receive, from a first device, first input data representing a first natural language input corresponding to a first dialog;
determine first output data responsive to the first natural language input;
send the first output data to the first device;
determine to perform additional processing using the first dialog;
determine, based at least in part on at least one of the first input data or the first output data, that a first permission is needed for the additional processing;
generate second output data requesting the first permission to authorize the additional processing;
receive second input data representing the first permission to perform the additional processing; and
in response to receiving the second input data, cause a first action to be performed.

14. The system of claim 13, wherein the memory further comprises instructions that, when executed by the at least one processor, further cause the system to:
perform natural language processing on at least one of the first input data or the first output data to determine that at least one of the first input data or the first output data includes sensitive information; and
determine that the first permission is needed for the additional processing.

15. The system of claim 13, wherein the memory further comprises instructions that, when executed by the at least one processor, further cause the system to:
perform user recognition processing on the first input data to determine a first user profile;
perform user recognition processing on the second input data to determine that the second input data corresponds to the first user profile; and
in response to the second input data corresponding to the first user profile, cause the first action to be performed with regard to the first dialog.

16. The system of claim 13, wherein the memory further comprises instructions that, when executed by the at least one processor, further cause the system to:
determine that a first skill requires second permission to access first data corresponding to the first dialog;
generate third output data requesting the second permission to authorize the first skill to access the first data;

receive third input data representing the second permission; and in response to receiving the third input data, grant the first skill access to the first data.

17. The system of claim 13, wherein the memory further comprises instructions that, when executed by the at least one processor, further cause the system to:
generate the second output data by generating first audio data representing synthesized speech;
receive the second input data by receiving second audio data representing an utterance;
cause the first action to be performed by:
processing the second audio data to determine that the second input data grants the first permission to perform the additional processing with regard to the first dialog, and
storing first data that includes at least the second audio data, an indication that the first permission to perform the additional processing is granted, and an identifier associated with the first dialog.

18. The system of claim 13, wherein the memory further comprises instructions that, when executed by the at least one processor, further cause the system to:
generate third output data requesting feedback corresponding to the first output data;
send the third output data to the first device;
receive, from the first device, third input data responsive to the third output data;
process the third input data to determine that the third input data indicates a type of feedback; and
determine, using the type of feedback, to perform the additional processing using the first dialog.

19. The system of claim 13, wherein the memory further comprises instructions that, when executed by the at least one processor, further cause the system to:
receive third input data representing a second natural language input corresponding to a second dialog;
determine third output data responsive to the second natural language input;
generate fourth output data requesting feedback corresponding to the third output data;
receive fourth input data responsive to the fourth output data;
process the fourth input data to determine that the fourth input data indicates a type of feedback;
determine, using the type of feedback, a second action to perform;
cause the second action to be performed.

20. The system of claim 13, wherein the memory further comprises instructions that, when executed by the at least one processor, further cause the system to:
send, from a first skill to a second skill, first data including a first identifier associated with a second action to perform and a second identifier associated with the first skill;
generate, using the second skill, third output data requesting feedback corresponding to the first output data;
receive, by the second skill, third input data responsive to the third output data;
process, by the second skill, the third input data to determine that the third input data indicates a type of feedback;
determine, by the second skill using the first identifier and the second identifier, the second action to perform;
perform the second action by sending second data from the second skill to the first skill, the second data indicating the type of feedback; and
determine, by the first skill using the type of feedback, to perform the additional processing.

* * * * *